(12) United States Patent
McEntire et al.

(10) Patent No.: US 12,433,294 B2
(45) Date of Patent: *Oct. 7, 2025

(54) ANTIPATHOGENIC DEVICES AND METHODS THEREOF FOR ANTIFUNGAL APPLICATIONS

(71) Applicant: SINTX Technologies, Inc., Salt Lake City, UT (US)

(72) Inventors: Bryan J. McEntire, Salt Lake City, UT (US); Ryan M. Bock, Salt Lake City, UT (US); Bhajanjit Singh Bal, Salt Lake City, UT (US)

(73) Assignee: SINTX Technologies, Inc., Salt Lake City, UT (US)

( * ) Notice: Subject to any disclaimer, the term of this patent is extended or adjusted under 35 U.S.C. 154(b) by 989 days.

This patent is subject to a terminal disclaimer.

(21) Appl. No.: 17/354,120

(22) Filed: Jun. 22, 2021

(65) Prior Publication Data

US 2021/0321617 A1    Oct. 21, 2021

Related U.S. Application Data

(63) Continuation-in-part of application No. 16/550,605, filed on Aug. 26, 2019, now Pat. No. 11,192,787.

(60) Provisional application No. 62/727,724, filed on Sep. 6, 2018, provisional application No. 62/800,034, filed on Feb. 1, 2019, provisional application No. 63/042,859, filed on Jun. 23, 2020.

(51) Int. Cl.
*A01N 59/00* (2006.01)

(52) U.S. Cl.
CPC .................................. *A01N 59/00* (2013.01)

(58) Field of Classification Search
None
See application file for complete search history.

(56) References Cited

U.S. PATENT DOCUMENTS

| | | | |
|---|---|---|---|
| 11,192,787 B2 | 12/2021 | McEntire et al. | |
| 11,591,217 B2 * | 2/2023 | McEntire | A61L 31/16 |
| 12,017,912 B2 * | 6/2024 | McEntire | A01N 59/02 |
| 2004/0000313 A1 | 1/2004 | Gaynor et al. | |
| 2005/0079379 A1 | 4/2005 | Wadsworth et al. | |
| 2009/0320172 A1 | 12/2009 | Slate et al. | |
| 2010/0040655 A1 | 2/2010 | Ren et al. | |
| 2010/0136325 A1 | 6/2010 | Reddy et al. | |
| 2012/0060258 A1 | 3/2012 | Stewart et al. | |
| 2013/0236854 A1 | 9/2013 | McEntire et al. | |
| 2017/0197014 A1 | 7/2017 | McEntire et al. | |
| 2020/0079651 A1 | 3/2020 | McEntire et al. | |
| 2022/0315941 A1 | 10/2022 | Flavell et al. | |

FOREIGN PATENT DOCUMENTS

| | | | |
|---|---|---|---|
| CN | 102805081 A | | 12/2012 |
| CN | 105085016 A * | | 11/2015 |
| CN | 106386908 A * | 2/2017 | ............ A01N 65/46 |
| CN | 107926975 A | | 4/2018 |
| EP | 0807766 B1 | | 12/2003 |
| JP | H2277849 A | | 11/1990 |
| JP | 2001003276 A1 | | 1/2001 |
| JP | 2009526828 A | | 7/2009 |
| JP | 2012528255 A | | 11/2012 |
| JP | 2015516239 A | | 6/2015 |
| JP | 2018002646 A2 | | 1/2018 |
| JP | 2020019677 A | | 2/2020 |
| JP | 2020512072 A | | 4/2020 |
| KR | 1020090003230 A | | 1/2009 |
| KR | 1020150005986 A | | 1/2015 |
| WO | 2011067005 A1 | | 6/2011 |
| WO | 2021211697 A1 | | 10/2021 |

OTHER PUBLICATIONS

Korean Intellectual Property Office, Notification of Provisional Rejection, Application No. 10-2021-7009890, Jan. 12, 2024, 17 pages.
Japan Patent Office, Decision of Refusal, Application No. 2021-510805, mailing date Jul. 18, 2023, 3 pages.
Office Action issued Nov. 25, 2022 in Canadian Application No. 3,109,874, 4 pages.
Japan Patent Office, Notice of Reasons for Rejection, Application No. 2021-510805, mailing date Jan. 24, 2023, 5 pages.
International Search Report and Written Opinion issued in corresponding Application No. PCT/US2021/038364, Oct. 14, 2021, 8 pages.
Pezzotti, Silicon Nitride: A Bioceramic with a Gift, ACS Applied Materials & Interfaces, vol. 11, Issue 30, 2019, pp. 26619-26636 [retrieved on Aug. 26, 2021] Retrieved from Internet <url:https://pubs.acs.org/dci/full/10.1021/acsami.9b07997> <DOI: 10.1021/acsami.9b07997>, entire document.
First Examination Report issued in corresponding Indian Application No. 202137015785, 7 pages.
U.S. Patent and Trademark Office, Final Office Action, U.S. Appl. No. 17/230,284, dated Apr. 6, 2023, 9 pages.
U.S. Patent and Trademark Office, Non-Final Office Action, U.S. Appl. No. 17/230,395, dated Apr. 6, 2023, 11 pages.
IP Australia, Examination Report No. 2 for Standard Patent Application, Application No. 2019336133, dated May 3, 2023, 5 pages.
China National Intellectual Property Administration (CNIPA), First Office Action, Application No. 201980058291.0, Mar. 8, 2023, 18 pages.
U.S. Patent and Trademark Office, Final Office Action, U.S. Appl. No. 17/230,402, dated Apr. 14, 2023, 11 pages.
U.S. Patent and Trademark Office, Non-Final Office Action, U.S. Appl. No. 18/062,681, dated Jul. 17, 2023, 8 pages.
European Patent Office, Partial Supplementary European Search Report, Application No. 21788806.4, Mar. 27, 2024, 12 pages.
European Patent Office, Extended European Search Report, Application No. 21788806.4, Jun. 17, 2024, 11 pages.

(Continued)

*Primary Examiner* — Alton N Pryor
(74) *Attorney, Agent, or Firm* — Polsinelli PC

(57) ABSTRACT

Various embodiments for antipathogenic devices and methods thereof for antifungal applications are disclosed herein.

12 Claims, 16 Drawing Sheets

(56) References Cited

OTHER PUBLICATIONS

European Patent Office, Extended European Search Report, Application No. 21832601.5, Jun. 20, 2024, 8 pages.
China National Intellectual Property Administration, Decision on Rejection, Application No. 201900582910, Apr. 12, 2024 17 pages.
Pezzotti et al., Rapid Inactivation of SARS-CoV-2 by Silicon Nitride, Copper, and Aluminum Nitride, Jun. 20, 2020, 16 pages.
IP Australia Office, Examination Report 1, Application No. 2023233117, Feb. 20, 2025, 4 pages.
U.S. Patent and Trademark Office, Non-Final Office Action, U.S. Appl. No. 17/839,063, dated Mar. 25, 2025, 58 pages.
Japan Patent Office, Notice of Reasons for Rejection, Application No. 2022-562405, May 7, 2025, 5 pages.
Korean Intellectual Property Office, Notice of Preliminary Rejection, Application No. 10-2022-7038579, May 16, 2025, 13 pages.
Japan Patent Office, Notice of Reasons for Rejection, Application No. 2023-071160, Sep. 24, 2024, 3 pages.
Lehman, C. et al., "Silicon Nitride Inactivates SARS-COV-2 in Vitro," BIORIXIV, Aug. 29, 2020, pp. 1-11.
Extended European Search Report issued in corresponding Application No. 19856613.5 on May 2, 2022, 10 pages.
China National Intellectual Property Administration, Second Office Action, Application No. 201900582910, Nov. 13, 2023, 25 pages.

\* cited by examiner

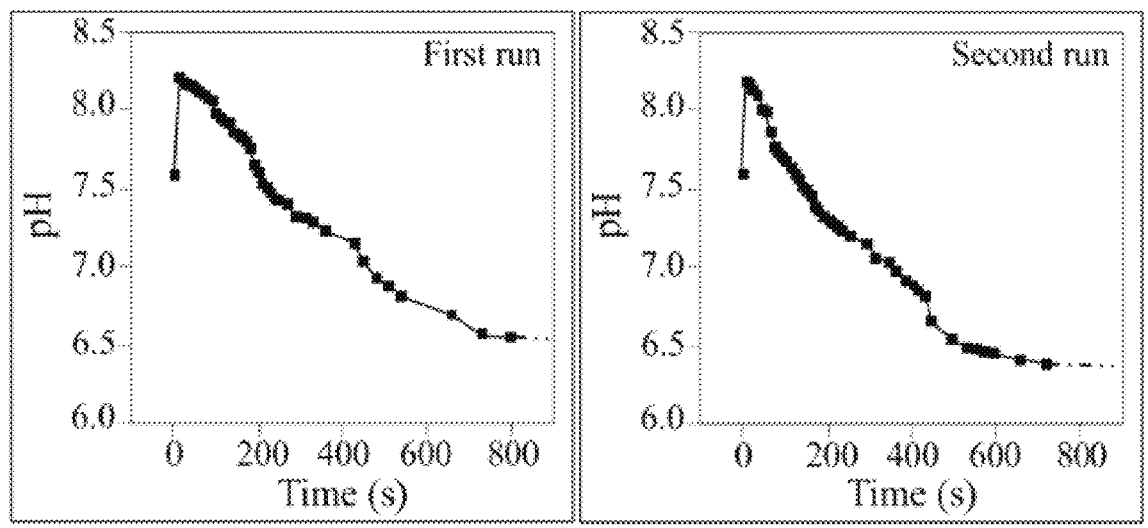
FIG. 1A  FIG. 1B
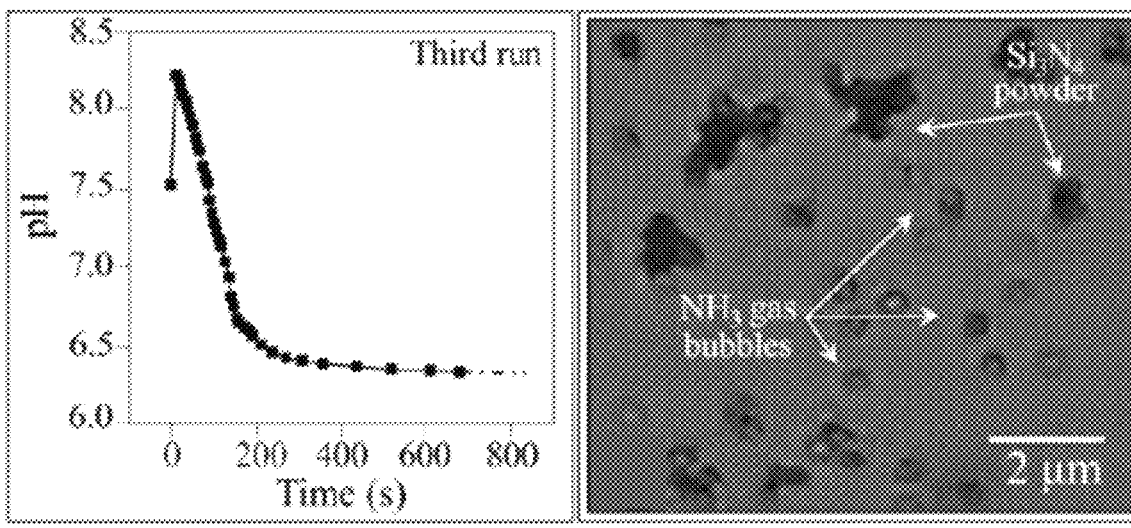
FIG. 1C  FIG. 1D

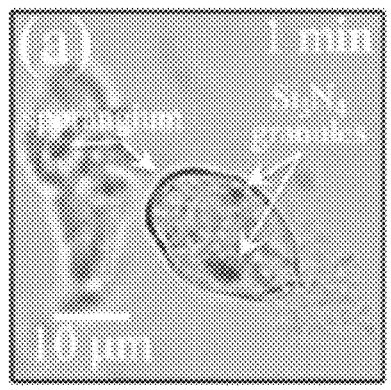 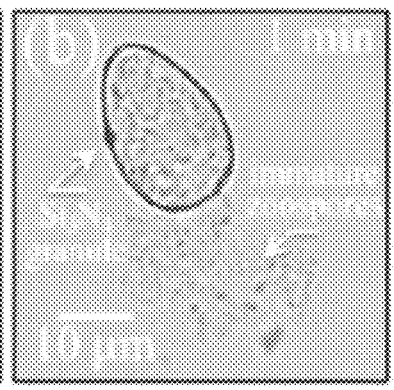 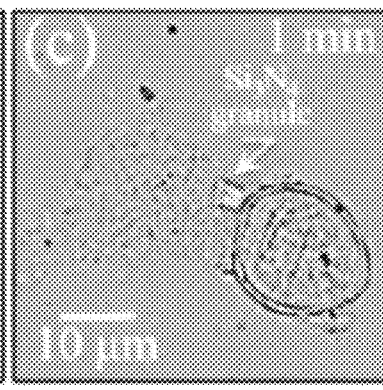
FIG. 2A  FIG. 2B  FIG. 2C
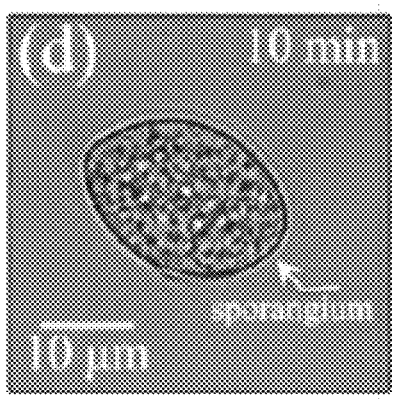 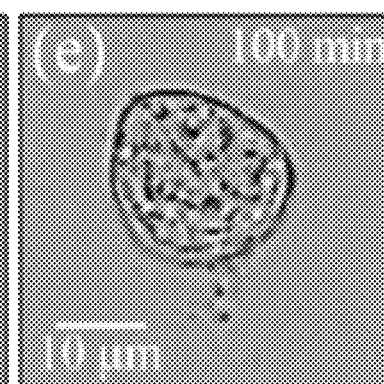 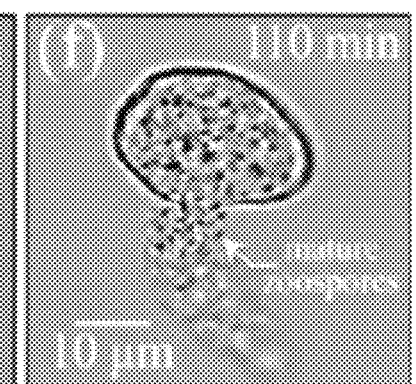
FIG. 2D  FIG. 2E  FIG. 2F
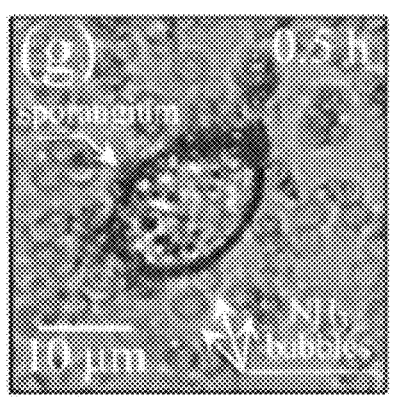 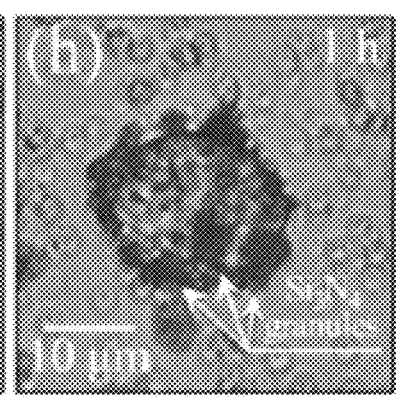 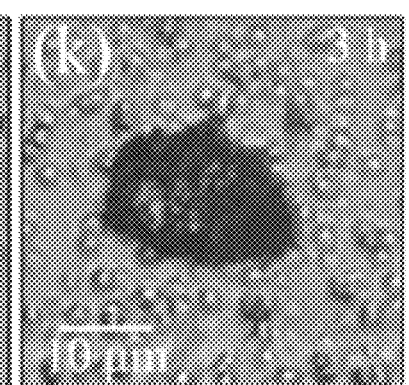
FIG. 2G  FIG. 2H  FIG. 2K

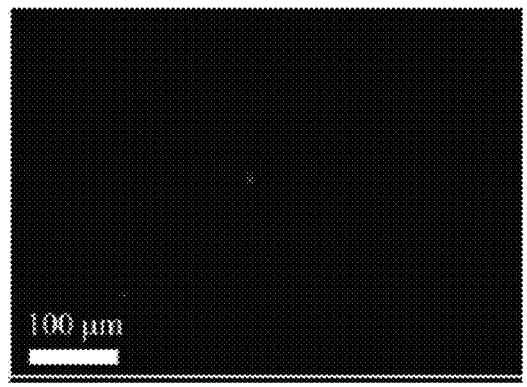 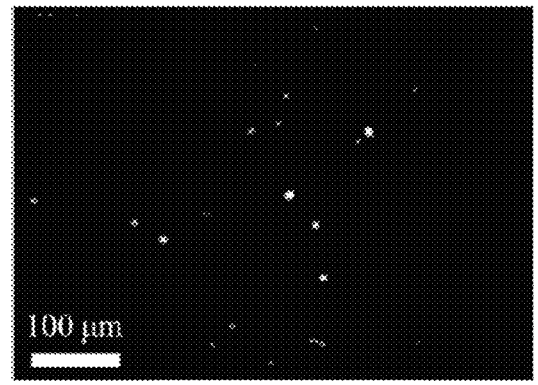
FIG. 4A  FIG. 4B
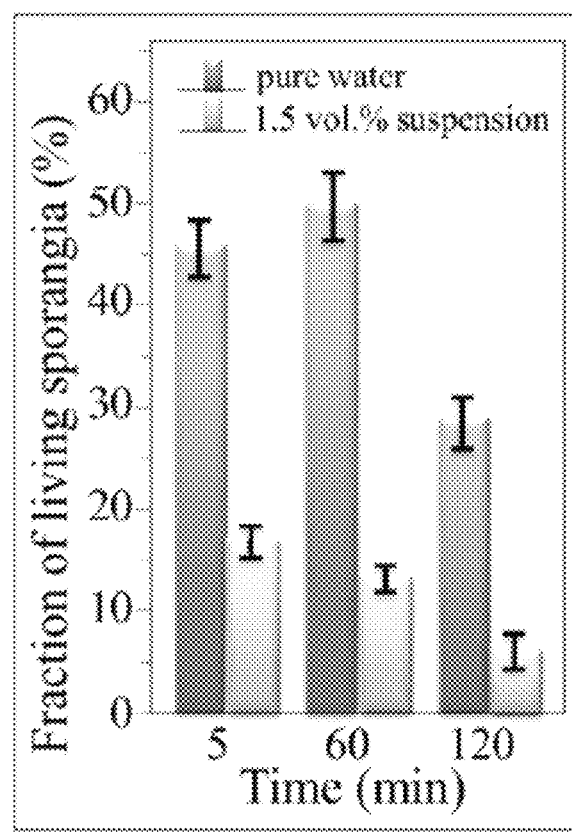
FIG. 4C

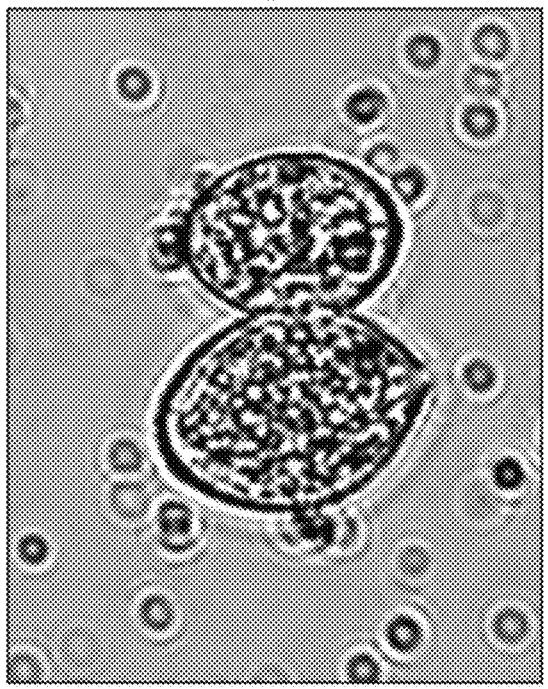 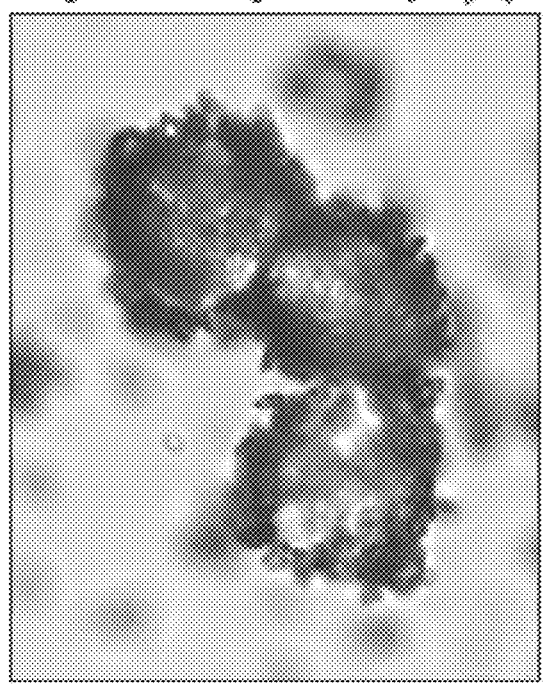
FIG. 14A                    FIG. 14B

ANTIPATHOGENIC DEVICES AND METHODS THEREOF FOR ANTIFUNGAL APPLICATIONS

CROSS-REFERENCE TO RELATED APPLICATIONS

This application is a Continuation-in-Part of U.S. application Ser. No. 16/550,605, filed Aug. 26, 2019 that claims the benefit of U.S. Provisional Applications 62/727,724, filed Sep. 6, 2018 and 62/800,034, filed Feb. 1, 2019. This application also claims the benefit of U.S. Provisional Application No. 63/042,859, filed Jun. 23, 2020. The contents of all of which are entirely incorporated by reference herein.

FIELD

The present disclosure generally relates systems and methods for an antipathogenic device, and in particular to a silicon nitride bioceramic which possesses antifungal properties against *Plasmopara viticola* pathogen having no toxicity to humans or adverse effects on the environment.

BACKGROUND

Figure 7A:
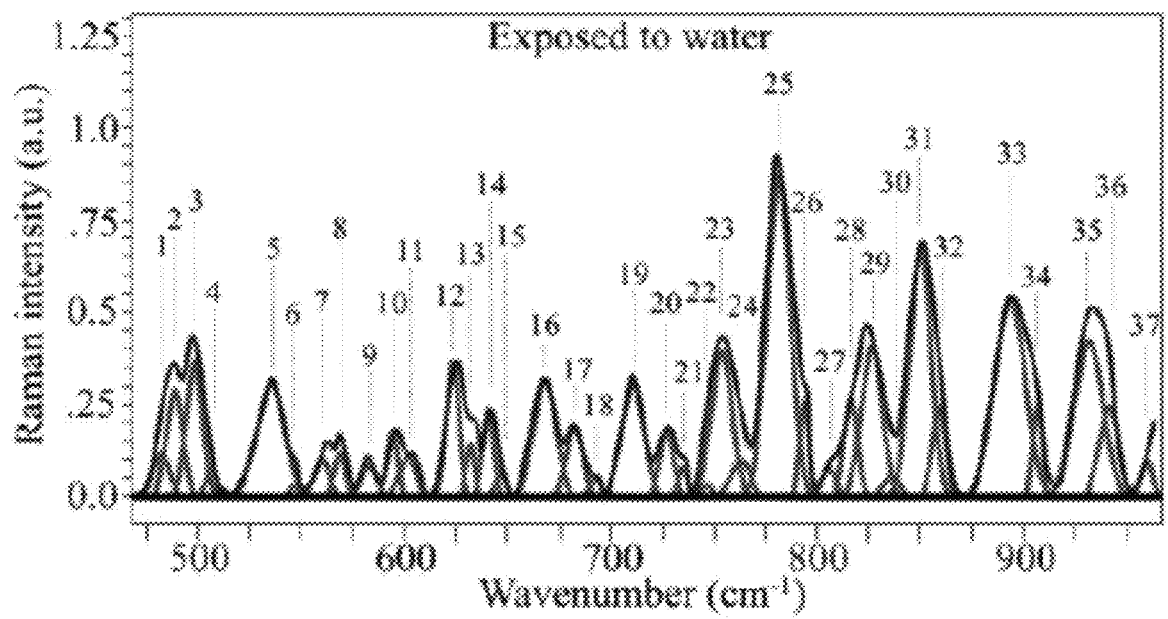
Figure 7B:
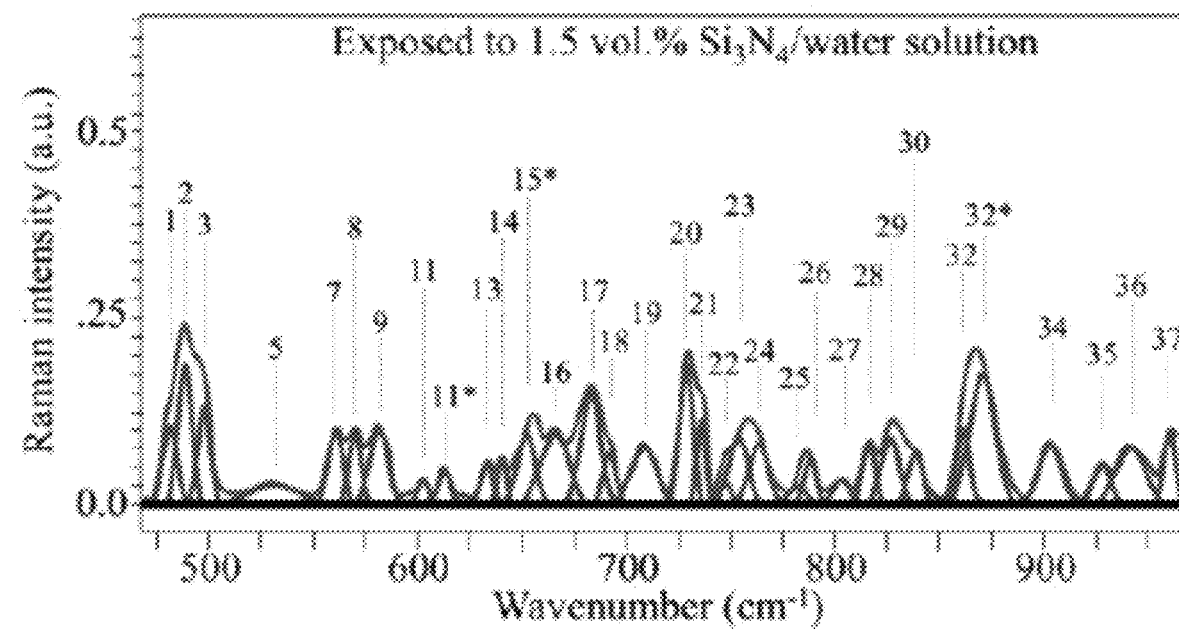

The application of agrochemicals is the most common method of preventing grapevine infections and improving harvest yields. However, powdery and downy mildew diseases, which can be caused by the oomycete *Plasmopara viticola*, require frequent applications of large quantities of antimycotic agents. Nearly two-thirds of all applied synthetic fungicides in the European Union are used to control these types of plant pathogens. Native to North America and accidentally introduced into Europe at the end of the last century, *Plasmopara viticola* can only be controlled through multiple weather-modulated annual applications. To minimize both health-risks and their environmental impact, only a limited number of fungicides at minimum concentrations are used, but both factors increase the risk that the pathogens will develop resistance. For these reasons, efforts to find alternatives to chemical treatments have garnered considerable attention, including the development of eco-friendly antifungal products. Some of the new concepts include microorganisms that confer systemic resistance to plant pathogens. Breeding resistance to infections via manipulation of host-pathogen interactions using population genetics is another favored technique. This is often done in parallel with chemical control. These latter approaches have their origins in transcriptomic and analytical methods. The search for alternatives to agrochemicals has become a priority of our modern society given the public's sensitivity to health, safety, and environmental issues.

*Plasmopara viticola* attacks all parts of the plant including leaves and young fruit. Assisted by temperate and humid weather, asexual sporangia release zoospores which eventually attach to and encyst into stomata to form a penetrating germ tube down to the substomatal cavity. The germ tube eventually transforms into an infection vesicle. A primary hypha emerges and quickly develops branches whose haustoria penetrate plant tissue to draw nutrients. After several days of infective incubation, the sporangiophores emerge to form new sporangia. A broad number of fungicides are applied during the growing season, but their type, amount, and timing depend on the nature of the disease and the variety of the grapevine. In most geographic areas, management of downy mildew requires several applications, starting very early in the growth cycle. The frequent use of fungicides, their high cost, and their long-term harm to the environment call for the development of more effective, long-lasting, and eco-friendly alternatives. Given the potential of these new concepts and substances, traditional fungicidal compounds should be restricted to conditions where they are truly needed.

It is with these observations in mind, among others, that various aspects of the present disclosure were conceived and developed.

SUMMARY OF THE DISCLOSURE

Disclosed herein are methods for treating or preventing a pathogen in a plant, the method comprising contacting the plant with a composition comprising silicon nitride. The composition may comprise a slurry of silicon nitride particles and an aqueous solvent. In some embodiments, the solvent may include water. In some embodiments, the composition may comprise about 0.5 vol. % to about 20 vol. % of silicon nitride. The contacting step may include spraying, misting, or dipping. The plant may include an agriculture plant, a tree, or a vine. In some specific embodiments, the plant may be a grain, legume, tuber, grass, oilseed, vegetable, or fruit. In some other specific embodiments, the tree may be a fruit, landscape, or forest tree. In yet other specific embodiments, the vine may be a grapevine. In one example, the plant may be *Vitis vinifera*, including Cabernet Sauvignon, Cannonau, or *Sultana*. The pathogen may include a pathogen that causes a plant disease including downy mildew, powdery mildew, *Botrytis* rot, *Fusarium* rot, rust, *Rhizoctonia* rot, Clerotinia rot, or *Sclerotium* rot. The pathogen may be a fungus, such as *Plasmopara viticola*.

Other aspects and iterations of the invention are described more thoroughly below.

BRIEF DESCRIPTION OF THE DRAWINGS

FIGS. 1A-1C are graphical representations showing the measurements of pH as a function of time in $Si_3N_4$ water suspension and FIG. 1D is an image of gas bubbles produced shortly after dispersion of $Si_3N_4$ powder.

FIGS. 2A-2C are micrographs of sporangia in a water environment with granules of $Si_3N_4$ powder in suspension; FIGS. 2D-2F show micrographs of sporangia embedded in pure water in the absence of $Si_3N_4$ powder; and FIGS. 2G-2K show micrographs illustrating those sporangia that gradually become fully covered by $Si_3N_4$ granules and did not release zoospores.

FIG. 3A is an image showing the interaction between the membrane of the sporangium and $Si_3N_4$ granules over time and FIG. 3B is an enlarged view of FIG. 3A.

FIGS. 4A and 4B are fluorescence images of living sporangia with a concentration $3.0\times10^4$ $ml^{-1}$ suspended in water for 0-2 hours with $Si_3N_4$ granules (FIG. 4A) and without $Si_3N_4$ granules (FIG. 4B); and FIG. 4C is a graphical representation of a fractional plot that shows concurrent quantification of the total fraction of sporangia and of the living sporangia detected upon direct counting on the fluorescence images.

FIGS. 5A-5C are images of a grapevine species, Cabernet Sauvignon, in which a control group (FIG. 5A), a pre-treated group (FIG. 5B), and a co-treated group (FIG. 5C) are shown.

FIGS. 6A-6C are images of a grapevine species, Cannonau, in which a control group (FIG. 6A), a pre-treated group (FIG. 6B), and a co-treated group (FIG. 6C) are shown.

FIGS. 7A and 7B are graphical representations of an average Raman spectrum of *P. viticola* after immersion for 10 minutes at room temperature in pure water (FIG. 7A) and in a water suspension containing 1.5 vol. % $Si_3N_4$ powder (FIG. 7B).

Figure 8A:
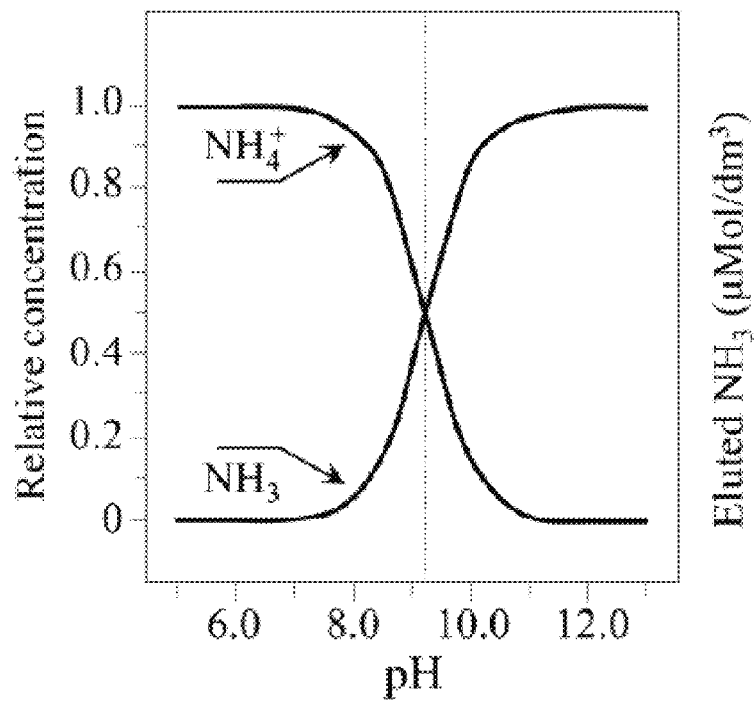
Figure 8B:
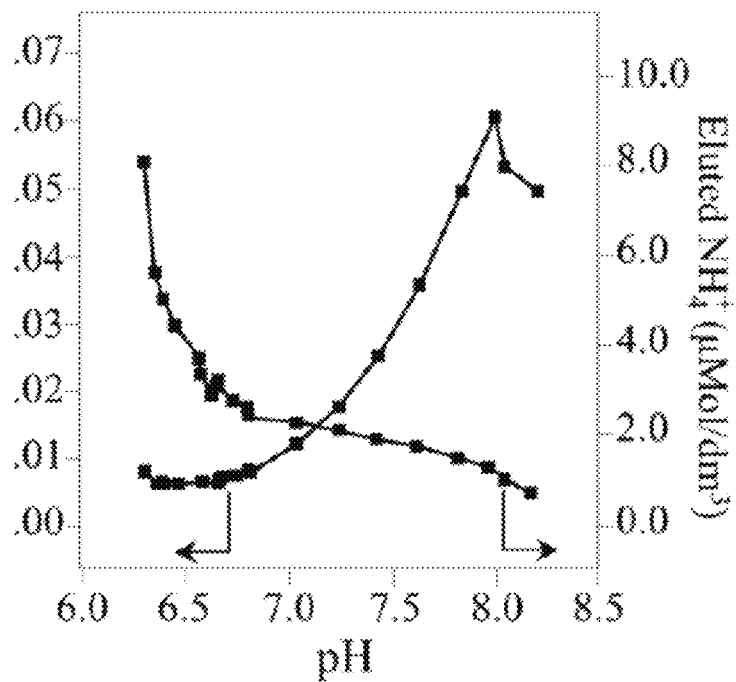

FIG. 8A is a graphical representation showing the relative concentrations of $NH_3$ and $NH_4^+$ and FIG. 8B is a graphical representation showing quantitative plots of nitrogen species eluted in water as a function of pH.

Figure 9A:
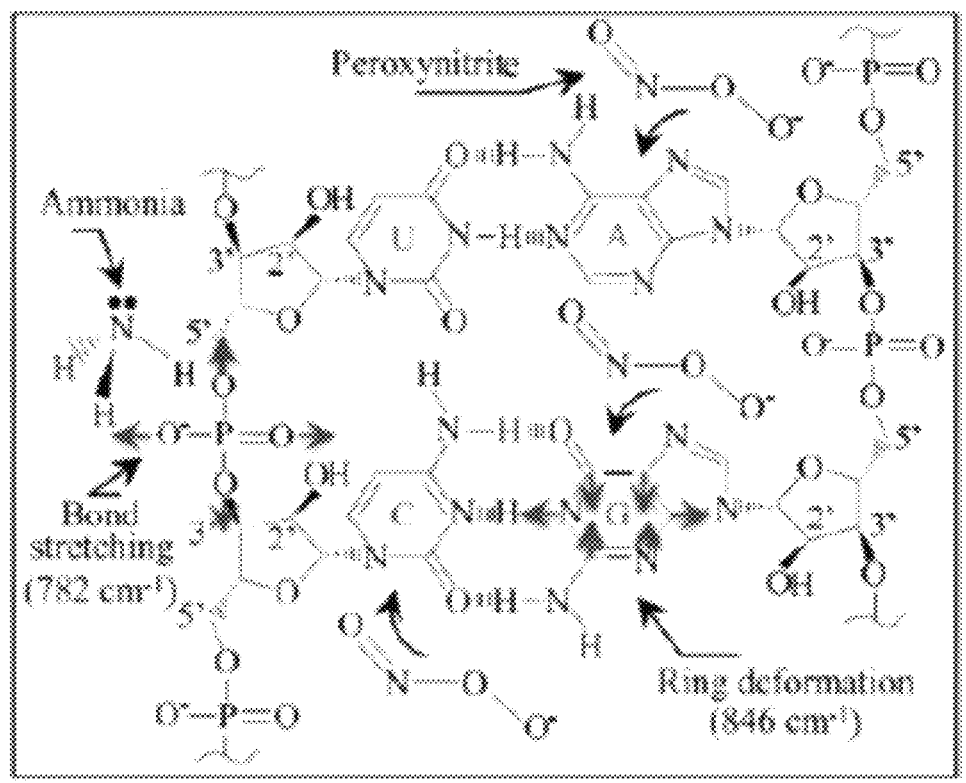
Figure 9B:
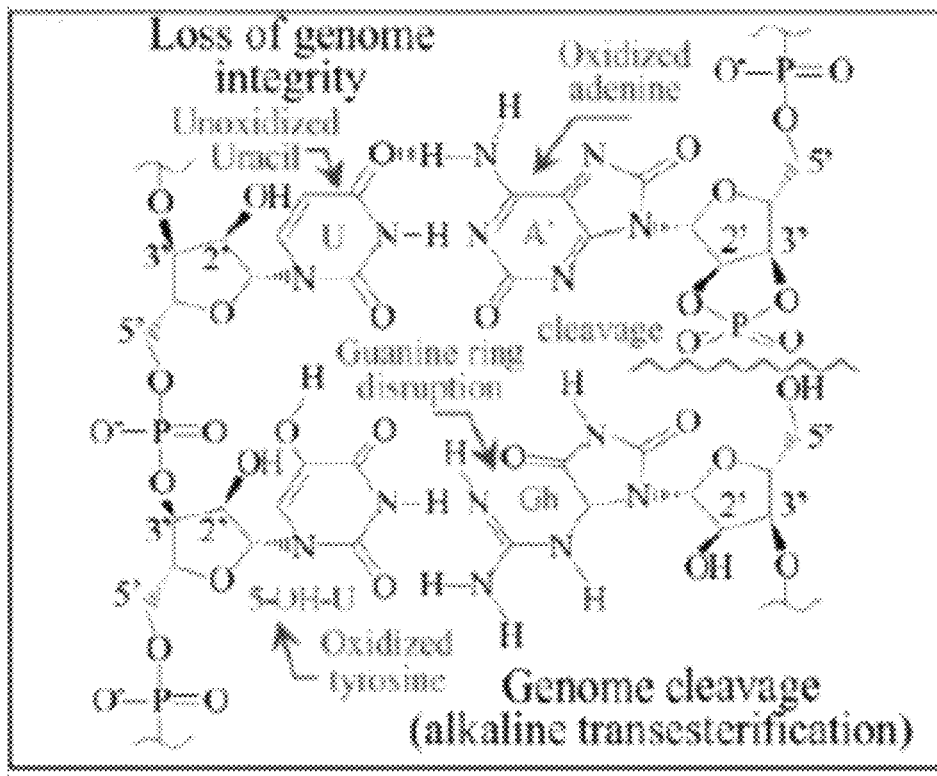
Figure 9C:
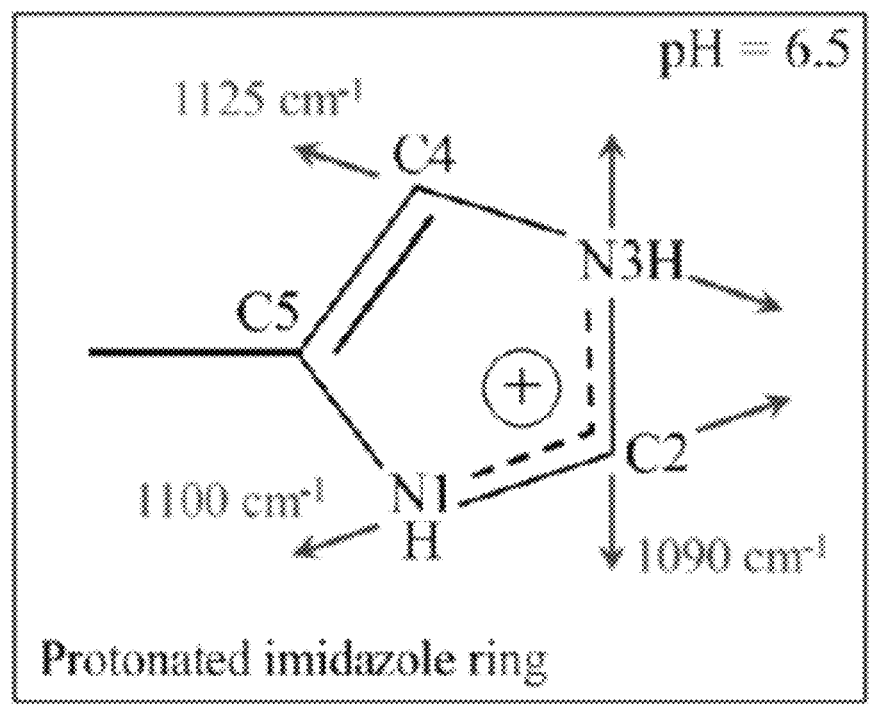

FIG. 9A is a pristine structure of DNA nucleobase for sporangia exposed to water with the main vibrational modes observed; FIG. 9B is a DNA nucleobase for sporangia showing the loss of genome integrity due to the presence of passively penetrated $NH_3$, FIG. 9C shows a protonated imidazole ring with both N atoms in the ring being protonated and in neutral form; and FIG. 9D shows a deprotonated imidazole ring with one proton lost.

FIGS. 10A and 10B are graphical representations showing high resolution Raman signals from the spectral zone 1050-1150 $cm^{-1}$ related to the vibrations of charged and neutral imidazole ring of the structures shown in FIGS. 9A and 19, respectively.

FIG. 11A is a schematic illustration showing the buffering effect and related ammonia elution in stomata entrapping $Si_3N_4$ granules and FIG. 11B is a schematic illustrations showing the charge attraction of $Si_3N_4$ granules to sporangia with the formation of ammonium and ammonia as antifungal agents active at the pathogen/$Si_3N_4$ interface.

FIG. 12A shows Cabernet Sauvignon leaves inoculated with *Plasmopara viticola* untreated. FIG. 12B shows Cabernet Sauvignon leaves inoculated with *Plasmopara viticola* treated for 1 minute with 1.5 vol. % $Si_3N_4$ powder.

FIG. 13 is a graph of the infected leaf area of Cabernet Sauvignon and Cannonau leaves with control and treated *Plasmopara viticola.*

FIG. 14A shows untreated spore sacs. FIG. 14B shows spore sacs in the presence of $Si_3N_4$.

Reference characters indicate corresponding elements among the view of the drawings. The headings used in the figures do not limit the scope of the claims.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional de-tails are not described in order to avoid obscuring the description.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

As used herein, the terms "comprising," "having," and "including" are used in their open, non-limiting sense. The terms "a," "an," and "the" are understood to encompass the plural as well as the singular. Thus, the term "a mixture thereof" also relates to "mixtures thereof."

As used herein, "about" refers to numeric values, including whole numbers, fractions, percentages, etc., whether or not explicitly indicated. The term "about" generally refers to a range of numerical values, for instance, ±0.5-1%, ±1-5% or ±5-10% of the recited value, that one would consider equivalent to the recited value, for example, having the same function or result.

As used herein, the term "silicon nitride" includes $Si_3N_4$, alpha- or beta-phase $Si_3N_4$, SiYAlON, SiYON, SiAlON, or combinations of these phases or materials.

The present disclosure relates to methods for treating or preventing a pathogen in a plant. The method includes contacting the plant with a composition comprising silicon nitride. In some embodiments, the contacting step may include spraying, misting, or dipping.

The surface of $Si_3N_4$ undergoes homolytic dissociation of Si—N covalent bonds in an aqueous environment. The release of nitrogen and silicon is the chemical origin of $Si_3N_4$'s biological effectiveness. A hydrolysis process initiates the protonation of amino groups at the $Si_3N_4$ surface. The electrophilicity at the adjacent silicon sites increases, which in turn leads to the propensity of these sites to undergo nucleophilic attack by water. As water interacts with silicon sites, metastable pentacoordinated complexes first form, but then promptly decay with the liberation of ammonia/ammonium ions at a ratio that depends on the environmental pH. The pH-dependent elution of ammonia ($NH_3$) or ammonium ($NH_4^+$) takes place together with the formation of silicon dioxide ($SiO_2$) on the solid surface. Hydrolysis of this latter species produces orthosilicic acid, $Si(OH)_4$. The basic chemical reactions of $Si_3N_4$ in water are as follows:

$$Si_3N_4 + 6H_2O \rightarrow 3SiO_2 + 4NH_3 \quad (1)$$

$$H^+ + NH_3 \rightarrow NH_4^+ \quad (2)$$

$$SiO_2 + 2H_2O \rightarrow Si(OH)_4 \quad (3)$$

At room temperature, the fraction of $NH_3$ varies with pH according to a sigmoidal dependence:

$$[NH_3][H^+]/[NH_4^+] = \mathbf{5.7\times10^{-10}} \quad (4)$$

This indicates that the relative fraction of free $NH_3$ at physiological pH is quite low (i.e., 1-2% of the overall amount of ammonium species eluted). However, at a pH of ~8.3, it increases to ~7%. FIG. 8A provides a graph of Eq. (4). It shows the relative concentrations of $NH_3$ and $NH_4^+$.

In FIG. 8B, quantitative plots as a function of pH are shown for their concentrations in pure water. These values were computed from the data in FIG. 1A using Eq. (4) and calibrated according to published colorimetric ammonia assays. Ammonia can readily penetrate the pathogen's cellular membrane where it cleaves the phosphate deoxyribose DNA backbone (referred to as genome cleavage by alkaline transesterification). However, another important aspect of $Si_3N_4$ in water is the formation of free radicals. This involves a series of transient off-stoichiometric reactions which begins with the breakage of Si—N bonds, the release of free-electrons, and formation of oxygen radicals, as follows:

$$Si - N \rightarrow Si^+ + N^{\cdot} + e^- \quad (5)$$

$$H_2O + e^- \rightarrow H^{\cdot} + OH^- \quad (6)$$

$$^1O_2 + e^- \rightarrow O_2^- \quad (7)$$

$$O_2^- + H^+ \rightarrow HO_2^- \quad (8)$$

$$Si - OH_{2(s)}^+ \rightarrow Si - OH_{(s)} + H_{(aq)}^+ \quad (9)$$

$$Si - OH_{(s)} \rightarrow Si - O_{(s)}^- + H_{(aq)}^+ \quad (10)$$

$$Si - (NH_3^+)_{(s)} \rightarrow Si - NH_{2(s)} + H_{(aq)}^+ \quad (11)$$

These reactions, Equations (5)-(11), represent a cascade of chemical events which includes free-electron release (Eq. (5)), splitting of water molecules (Eq. (6)), and the formation of radical oxygen anions and highly oxidative protonated species (Equations (7) and (8)). These latter species contribute to the dissociation of surface silanols (Equations. (9)-(11)), which in turn leads to the formation of additional oxygen radicals, i.e., (≡Si—O') and (≡Si—$O_2'$-. Free-electrons also oxidize ammonia ($NH_3$) into hydroxylamine ($NH_2OH$, i.e., ammonia monooxygenase) and its successive reaction with water to form nitrous acid $HNO_2$ with the production of additional free-electrons and protons.

$$NH_3 + 2e^- + 2H + O_2 \rightarrow NH_2OH + H_2O \rightarrow HNO_2 + 4e^- + 4H^+ \quad (12)$$

$$NH_2OH \rightarrow NO + 3H^+ 3e^- \quad (13)$$

$$2HNO_2 \rightarrow NO + NO_2^- + H_2O \quad (14)$$

Equation (12) (i.e., ammonia monooxygenase) provides the free-electrons needed to catalyze $NH_3$ oxidation, along with the formation of nitrous acid, additional free-electrons, and hydrogen protons. Equation (13) (i.e., hydroxylamine oxidoreductase) produces nitric oxide (NO), additional free-electrons, and hydrogen protons. The formation of additional NO and nitrite ($NO_2^-$) according to Eq. (14), together with oxygen radicals ($O_2^{*-}$) from Eq. (7) leads to the formation of peroxynitrite, $ONOO^-$, as follows:

$$O_2^- + NO \rightarrow {}^-OO - N = O \quad (15)$$

This ultimately leads to the formation of nitric oxide (NO) and peroxynitrite ($OONO^-$) radicals. They are among the most lethal agents to pathogens. The formation of peroxynitrite has been experimentally confirmed in a recent study of the interaction of $Si_3N_4$ and *Candida albicans* using stimulated emission depletion microscopy and a specific fluorescent stain kit for nitrative stress sensing targeting peroxynitrite. Conversely, peroxynitrite is not toxic to plant cells and NO is a crucial signal in induction of plant resistance against pathogen infections, therefore exerting a positive indirect effect on plant expression of defense-related genes.

I. Composition

The composition of the present disclosure comprises silicon nitride.

In some embodiments, silicon nitride powder may be incorporated into compositions including, but not limited to slurries, suspensions, gels, sprays, or pastes. In at least one example, the composition may comprise a slurry of silicon nitride particles dispersed in a solvent. In some aspects, the solvent may be water. For example, silicon nitride particles may be mixed with water along with any appropriate dispersants and slurry stabilization agents, and thereafter applied by spraying the slurry onto various agricultural plants, fruit-trees, vines, grain crops, and the like. In at least one example, a silicon nitride slurry may be sprayed on fungi infected grape leaves.

In an example, the antipathogenic composition may be a slurry of silicon nitride powder and water. The silicon nitride powder may be present in the slurry in a concentration of about 0.1 vol. % to about 20 vol. %. In various embodiments, the slurry may include about 0.1 vol. %, 0.5 vol. %, 1 vol. %, 1.5 vol. %, 2 vol. %, 5 vol. %, 10 vol. %, 15 vol. %, or 20 vol. % silicon nitride.

The composition may include about 0.5 vol. % to about 20 vol. % silicon nitride. In some embodiments, the composition may include about 0.5 vol. %, 1 vol. %, 2 vol. %, 3 vol. %, 4 vol. %, 5 vol. %, 6 vol. %, 7 vol. %, 8 vol. %, 9 vol. %, 10 vol. %, 11, 12, 13, 14, 15, 16, 17, 18, 19 or about 20 vol. % silicon nitride. In some additional embodiments, the composition may include about 0.5 vol. % to about 3 vol. %, about 3 vol. % to about 6 vol. %, about 6 vol. % to about 9 vol. %, about 9 vol. % to about 12 vol. %, about 12 vol. % to about 15 vol. %, about 15 vol. % to about 18 vol. %, or about 18 vol. % to about 20 vol. % silicon nitride. In one exemplary embodiment, the composition includes about 1 vol. % to about 3 vol. % silicon nitride.

The silicon nitride powder may have a particle size of about 1 μm to about 5 μm. In at least one example, the silicon nitride powder may have a particle size of about 2 μm.

II. Pathogen

The method of the present disclosure may be used to treat or prevent many known pathogens in a plant. In some embodiments, the pathogen may cause one or more plant disease, including downy mildew, powdery mildew, Btrytis rot, *Fusarium* rot, rust, *Rhizoctonia* rot, *Sclerotinia* rot, *Sclerotium* rot, and other pathogenic plant diseases known in the art. In some additional embodiments, the pathogen may be a fungus, including *Plasmopara viticola, Guignardia bidwellii, Uncinula necator, Botryotinia* fuckelina, and other fungi known in the art.

III. Plant

The composition disclosed in Section I of the present disclosure may be applied to a plant, wherein the plant is an agriculture plant, a tree, or a vine. In some embodiments, the agriculture plant may include a grain, legume, tuber, grass, oilseed, vegetable, or fruit.

(a) Grain

In some aspects, the grain may include teff, wheat, oats, rice, corn, barley, sorghum, rye, millet, triticale, amaranth, buckwheat, *quinoa*, bulgur, farro, freekeh, or other grains known in the art.

In some additional aspects, the legume may include peanuts, chickpeas, beans, peas, lentils, lupins, alfalfa, clover, mesquite, carob, soybeans, tamarind, and other legumes known in the art.

In yet additional aspects, the tuber may include beets, carrots, horseradish, parsnips, potatoes, radishes, sweet potatoes, turnips, rutabagas, taro, water chestnuts, yams, and other tubers known in the art.

In further additional aspects, the grass may include bamboo, marram grass, meadow-grass, reeds, ryegrass, sugarcane, and other grasses known in the art.

In still other aspects, the oilseed may include palm, soy, rapeseed, palm kernels, cottonseed, groundnut, olive, coconut, maize, sesame seed, linseed, safflower, sunflower, jatropha, camelina, cardoon, pennycress, and other oilseeds known in the art.

In still further aspects, the vegetable may include artichokes, asparagus, beetroot, broccoli, brussels sprouts, cabbage, carrots, cauliflower, celeriac, celery, fennel, garlic, ginger, kale, leeks, lettuce, parsnips, radishes, salad greens, shallots, spinach, spring onions, turmeric, turnips, watercress, and other vegetables known in the art.

In yet further aspects, the fruit may include apples, avocado, apricots, bananas, blackberries, blueberries, breadfruit, cantaloupe, cherries, clementines, coconut, cranberries, dates, figs, grapefruit, guava, honeydew melon, jackfruit, kiwi, kumquat, lemons, limes, mandarins, mangos, nectarines, oranges, papayas, passion fruit, peaches, pears, pineapples, plantains, plums, pomegranates, raspberries, rhubarb, strawberries, tangerines, watermelons, or any other fruit known in the art.

(b) Tree

In some embodiments, the tree may include a fruit tree, a landscape tree, or a forest tree.

In some aspects, the fruit tree may include almond trees, apple trees, apricot trees, avocado trees, cashew trees, cherry trees, coconut trees, fig trees, grapefruit trees, guava trees, jackfruit trees, lemon trees, lime trees, mango trees, olive trees, orange trees, peach trees, pear trees, pecan trees, plum trees, pomegranate trees, walnut trees, or any other trees known in the art.

In some additional aspects, the landscape tree may include *magnolia* trees, apple trees, dogwood trees, maple trees, maidenhair trees, katsura trees, spruce trees, arborvitae trees, birch trees, palm trees, cherry trees, holly trees, beech trees, and other landscape trees known in the art.

In yet additional aspects, the forest trees may include ash trees, birch trees, aspen trees, basswood trees, beech trees, cherry trees, chestnut trees, cottonwood trees, elm trees, fir trees, hickory trees, locust trees, maple trees, oak trees, pine trees, cedar trees, spruce trees, sycamore trees, willow trees, and other forest trees known in the art.

(c) Vine

In some embodiments, the vine may be a grapevine, watermelon vine, cucumber vine, ivy, creeper, hop, jasmine, or other vines known in the art. In some aspects, the vine is the grapevine *Vitis vinifera*. In some examples, the *Vitis vinifera* may include Cabernet Sauvignon, Cannonau, *Sultana*, Chardonnay, white Riesling, Pinot blanc, Pinot Gris, Gewurztraminer, Muscat Ottonel, Sauvignon blanc, Pinot noir, Pinot Meunier, Cabernet Franc, Merlot, Limberger, Gamay noir, Trollinger, Petite Verdot, Trebbiano Toscano, Garnacha, Syrah, Airen, Tempranillo, and other *Vitis vinifera* varieties known in the art.

IV. Methods

Further provided herein is a method of inactivating a pathogen by contacting the pathogen with a composition comprising silicon nitride. The pathogen may be a fungus or plant-based pathogen. The composition may be a slurry comprising silicon nitride particles and water.

In further embodiments, the method may include contacting the silicon nitride slurry with the surface of living agricultural plants, trees, grains, etc. infected with a plant-based pathogen. In an embodiment, infected leaves may be sprayed with an about 1 vol. % to about 40 vol % slurry of silicon nitride in water. The leaves may be exposed to the silicon nitride slurry for at least 1 minute, at least 5 minutes, at least 10 minutes, at least 20 minutes, at least 30 minutes, at least 1 hour, at least 2 hours, at least 5 hours, or at least 1 day.

In various examples, the infected area of leaves may be reduced by at least 50%, at least 60%, at least 70%, at least 80%, at least 90%, at least 95%, or at least 99%. In an example, after 1 minute of exposure, the infected area of the leaves may be reduced by about 95%. It was surprisingly found that silicon nitride particles may be electrically attracted to and attach to the spores of the pathogen.

EXAMPLES

Example 1

Downy mildew infections in grapevines are usually prevented by the intensive application of fungicides, including copper and sulfur (contact fungicides) or by synthetic broad-spectrum systemic fungicides such as benzimidazoles or triazoles. However, their use negatively impacts the environment and human health. Fungicide residues are long-term soil contaminants and non-negligible amounts of these compounds can be found in wine. While strict regulations attempt to minimize their harmful consequences, the situation calls for the development of alternative fungicidal strategies. These examples present the unprecedented case of a bioceramic, silicon nitride, which possesses antifungal properties against *Plasmopara viticola*, but no toxicity to humans or adverse effects on the environment. Raman spectroscopic assessments of living sporangia mechanistically showed that the nitrogen-chemistry of the bioceramic surface was responsible for inhibiting host infections.

These examples used silicon nitride ($Si_3N_4$), to knock-down *Plasmopara viticola* starting early in its infection cycle. The choice of this ceramic was based on its unique surface chemistry within an aqueous environment. It has antibacterial, antiviral, and antifungal properties, while still being friendly and supportive of eukaryotic cells. For these reasons, $Si_3N_4$ can be considered an environmentally friendly alternative for grapevine protection. In situ Raman spectroscopy was utilized to provide insight into the molecular mechanisms governing the pathogenicity of *Plasmopara viticola* on grapevine leaves and their inactivation by $Si_3N_4$. Raman spectroscopy is a non-invasive method that can be applied to living pathogens without markers, thus allowing time-lapse experiments to reveal their metabolic variations. The method monitors the structure of the pathogen and its evolution during chemical interactions with antipathogenic agents.

Example 2

To show the effect of silicon nitride on the inactivation of agricultural fungi, Cabernet Sauvignon leaves were infected with *Plasmopara viticola* at a concentration of $3 \times 10^4$ spore sacs/ml. Treated *Plasmopara viticola* was exposed to a slurry of 1.5 vol. % silicon nitride for 1 minute.

Figure 12A:
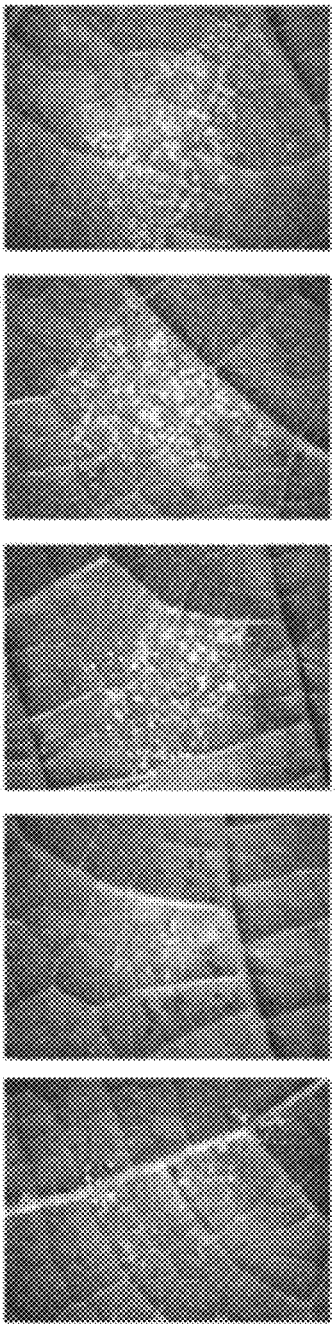
Figure 12B:
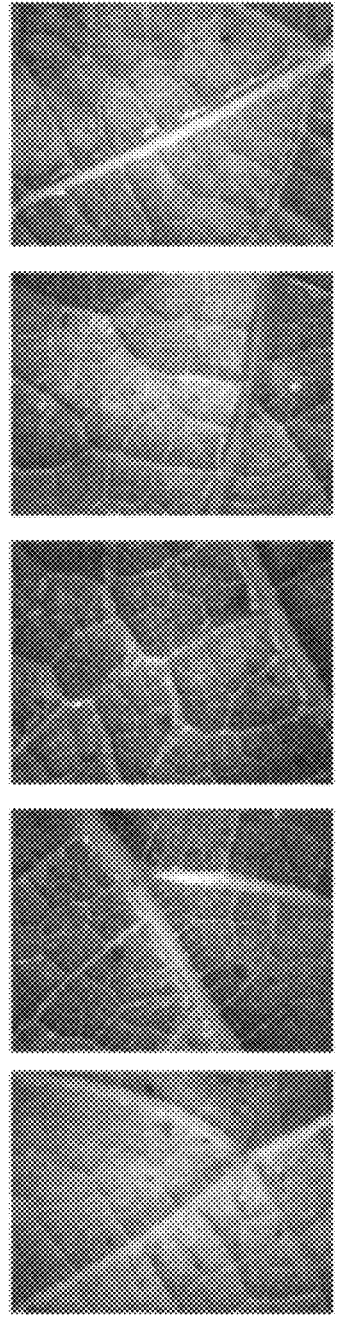
Figure 13:
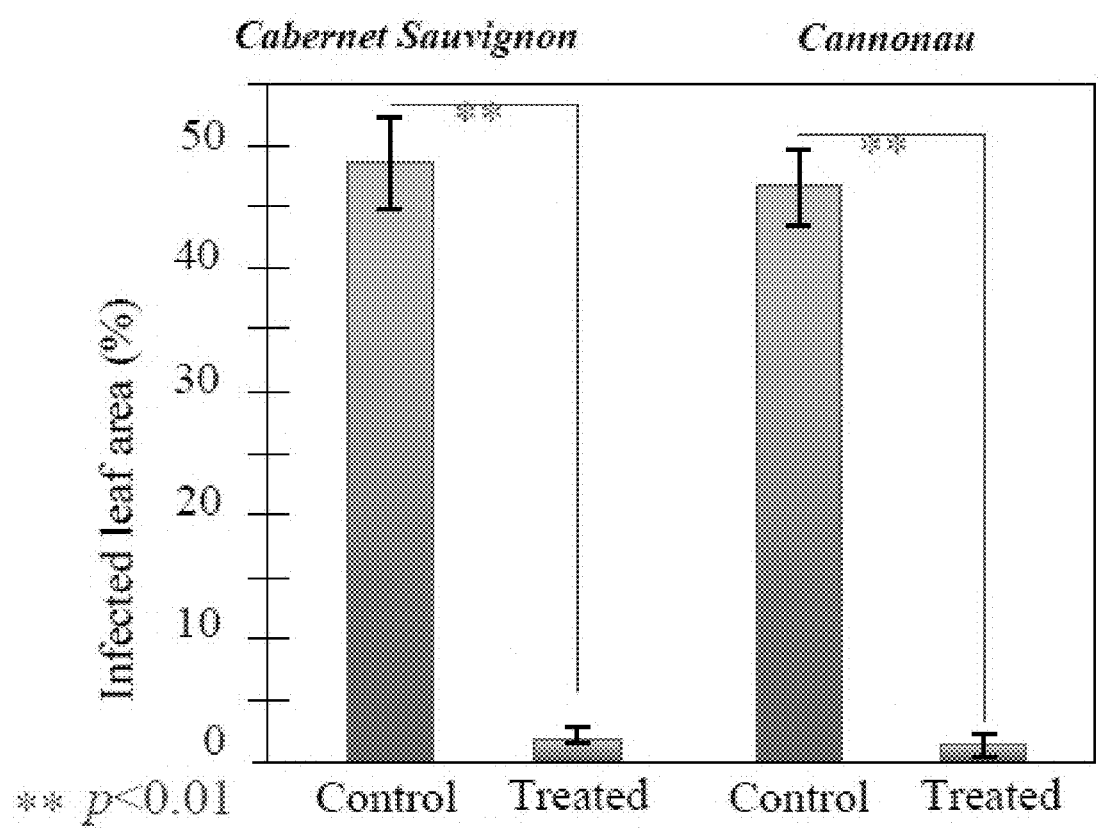

FIG. 12A shows untreated *Plasmopara viticola* fungi on Cabernet Sauvignon leaves. FIG. 12B shows treated *Plasmopara viticola* fungi on Cabernet Sauvignon leaves. It can be seen that the leaves inoculated with *Plasmopara viticola* treated for 1 minute with 1.5 vol. % $Si_3N_4$ powder have less of the fungi on the surface of the leaves. This is further evidenced by FIG. 13 which depicts the percentage of infected leaf area for both Cabernet Sauvignon and Cannonau leaves inoculated with control and treated *Plasmopara viticola*. FIG. 13 clearly shows a statistical significance difference for the infected leaf area between the control and treated fungi.

The silicon nitride particles appear electrically attracted to and attach themselves to the spores of the pathogen, as seen in FIG. 14B. FIG. 14A shows a microscopic image of untreated spore sacs of *Plasmopara viticola*, while FIG. 14B shows a microscopic image of spore sacs of *Plasmopara viticola* in the presence of $Si_3N_4$.

Example 3

*Plasmopara viticola* (*P. viticola*,) isolate harvested in a field in 2018 was axenically grown as described by Polesani et al., "General and species-specific transcriptional responses to downy mildew infection in a susceptible (*Vitis vinifera*) and a resistant (*V. riparia*) grapevine species," BMC Genomics 11:117 (2010). To evaluate the possible phytotoxicity of $Si_3N_4$, treatments were performed using two different grape varieties, Cabernet Sauvignon and Cannonau. Cabernet Sauvignon leaves were taken from 3-year-old plants, while Cannonau leaves were obtained from young seedlings grown in a greenhouse under controlled conditions (16 hours light/8 hours dark, temperature range 18-28° C.).

$Si_3N_4$ powder with a particle size of about 2 μm was used. It was obtained by grinding sintered $\beta$-$Si_3N_4$ powder having a nominal composition of 90 wt. % $\alpha$-$Si_3N_4$, 6 wt. % yttrium oxide ($Y_2O_3$), and 4 wt. % aluminum oxide ($Al_2O_3$). The constituents were sintered at ~1700° C. for >3 h and hot-isostatically pressed at about 1600° C. for 2 h. After preparation, it was heat sterilized at 180° C. for 2 h before suspension in sterile distilled water.

For evaluation of preventive efficacy, three lots of five disks were cut from sterilized leaves for each grape variety. One lot was treated by full immersion in a 1.5 vol. % aqueous suspension of $Si_3N_4$ for 1 minute and inoculated with 40-μL of germinated sporangia suspension ($3\times10^4$/mL) 24 h later (pre-treated samples). A second lot was exposed to sporangia combined with the 1.5 vol. % $Si_3N_4$ suspension. In this case, the $Si_3N_4$ granules remained in direct contact with the sporangia during germination (co-treated samples). The third lot was inoculated with *P. viticola* and served as an infection control group. All disks were incubated in a growth chamber at 21-24° C. with a day/night photoperiod of 16 hours and 8 hours, respectively, and monitored for 6 days until sporulation appeared on the controls.

To evaluate potential curative effects, three lots of six disks each were cut from sterilized grapevine leaves of the highly susceptible *Sultana* variety. All three lots were inoculated with *P. viticola* using 40 μL of sporangia suspension ($3\times10^4$/ml) and incubated in a growing chamber at 21-24° C. with day/night photoperiods of 16/8 h to allow for the onset of infection. Droplets were removed 24 h later with the same procedure as discussed previously. Three days after the appearance of infection, two lots were treated by full immersion in a 1.5 vol. % aqueous suspension of $Si_3N_4$ for 1 minute. Then, one of the two lots was washed in distilled water for one minute to remove $Si_3N_4$ residue. The third lot was left untreated as a control group.

Microscopy Observation

Sporangia suspended in water or the 1.5 vol. % $Si_3N_4$ suspension ($3\times10^4$ sporangia/mL) were observed under an epifluorescence microscope (excitation filter BP 340-380 nm; dichroic mirror 400 nm; suppression filter LP>430 nm) or stained with Fluorescein diacetate (FDA) and observed using a fluorescence microscope to check sporangia viability during a time course of 3 h. Observations were made in a cell counting Bürker chamber to calculate the percentage of viable sporangia in comparison to water-treated controls.

pH Measurements

The pH of sterile double distilled water was measured with a pH-meter after the addition of 15 vol. % $Si_3N_4$ powder. Measurements were made while stirring at room temperature as a function of time for up to 800 s at intervals of 10 s until final pH stabilization. To check whether the pH trend was reproducible, the tested powder sample was separated by centrifugation ($13\times10^3$ RPM for 3 min) and dried at 180° C. in air for 2 h. After cooling to room temperature, the powder was re-suspended at the same water concentration (i.e., 1.5 vol. %) for additional pH measurements. The procedure was repeated with the same powder for three subsequent cycles.

In Situ Raman Spectroscopy

In situ Raman spectra were collected on sporangia samples suspended in water solutions with and without $Si_3N_4$ powder. Raman spectra were obtained using a dedicated instrument operating in microprobe mode with a 50× optical lens. The spectroscope was equipped with a holographic notch filter which concurrently allowed high-efficiency and high-resolution spectral acquisitions. Excitation was made with a 785 nm laser source at a power of 15 mW. The Raman scattered light was monitored using a single monochromator connected with an air-cooled charge-coupled device (CCD) detector. The acquisition time of one spectrum was typically 60 s. The spectra for different sporangia samples were averaged over ~10 different collection locations. Raman spectra were deconvoluted into Gauss-Lorentz cross-product sub-band components using commercially available software (e.g. LabSpec 4.02). Spectral band assignments were made according to published literature.

Example 4 pH Analyses of $Si_3N_4$ Powder in Aqueous Suspensions

The change in pH as a function of time for the 15 vol. % $Si_3N_4$ water-suspension is shown in FIGS. 1A-1C. This pH experiment was conceived to simulate the effect of periodic rain in grapevine fields after having been sprayed with a dose of $Si_3N_4$ powder. Three successive repetitive trials involving suspension, measurement, and drying are given in FIGS. 1A, 1B and 1C, respectively. Independent of run sequence, the plots showed a sudden (within seconds) increase in pH from an initial neutral value (pH~7.5) to a maximum (pH~8.3). The curves for the first and second runs were very similar, while the third run showed a steeper reduction over time, although the plateau (pH~6.3-6.7) was similar for all trials. This phenomenon, which was characterized in a previous study using pH microscopy and a colorimetric ammonia assay, is associated with the cleavage of the Si—N bond at the $Si_3N_{4'5}$ surface and the reaction of eluted nitrogen with hydrogen to form ammonia ($NH_3$) or ammonium ($NH_4^+$). In an open system, a gradual drop in pH to 6.3-6.7 takes place in about 5 minutes. Since the fraction of $NH_3$ in solution is inversely dependent on pH, the time-dependent data suggest that an increasing fraction of highly volatile $NH_3$ leaves the aqueous system. This was confirmed by direct observation of gas bubbles produced shortly after the dispersion of $Si_3N_4$ powder (FIG. 1D) along with the typical pungent smell of ammonia. At pH-8.3, the fraction of $NH_3$ was computed to be 7-10%, while in the acidic solution it was nearly zero. These results show that the same $Si_3N_4$ powder can provide prolonged pH-buffering during sequential rain events, assuming that a fraction of the $Si_3N_4$ powder remains attached to the leaf rugosity or entrapped into the leaf stomatal cavities.

In Situ Microscopic Monitoring of Sporangia/$Si_3N_4$ Granule Interaction

FIGS. 2A-2C show micrographs of sporangia in the aqueous suspension interacting with granules of $Si_3N_4$ powder. Similar micrographs are given in FIGS. 2D-2F for sporangia in pure water. The $Si_3N_4$ appeared to be electrostatically attracted to the external wall of the sporangium. Contact occurred almost immediately upon the introduction of the sporangia into the suspension. This led to the premature rupture of the wall in less than a minute (cf. FIGS. 2A-2C). Conversely, the sporangia in pure water released their mature zoospores only after about 110 min. (cf. FIGS. 2D-2F). Interestingly, there was also a fraction of sporangia that did not rupture upon contact with $Si_3N_4$ granules. They gradually were covered by the $Si_3N_4$ granules but did not release zoospores until several hours later (cf time-lapse micrographs in FIGS. 2G-2K). Collectively, these micrographs revealed that an aggressive environment developed in the vicinity of the sporangia. The presence of ammonia gas bubbles coupled with increased pH, as shown in FIGS. 1A-1C, is related to the production of gaseous ammonia, a volatile molecule that easily penetrates the sporangia's cell wall. Similarly, fungal cells are permeable to ammonia, which enters the cells by free diffusion of the undissociated molecule.

A detailed observation of the interaction between the membrane of the sporangium and $Si_3N_4$ granules at a contact time of <1 min is shown in FIG. 3A. An enlarged view of the squared area in the inset is shown in FIG. 3B. This enlargement shows local swelling of the membrane (i.e., convex curvature) suggesting imminent rupture and release of immature zoospores. The survivorship of sporangia in contact with $Si_3N_4$ granules was monitored by optical and fluorescent microscopies to quantify the antifungal effect of the ceramic. FIGS. 4A and 4B show fluorescence images of living sporangia with a concentration $10^5$ $mL^{-1}$ suspended in water for 3 hours with and without 1.5 vol. % $Si_3N_4$ granules, respectively, and then stained with fluorescein diacetate. A concurrent quantification of the total fraction of sporangia (by light microscopy) and the living sporangia detected by direct counting of fluorescence images provided the fractional plot shown in FIG. 4C. A clear antifungal effect was observed for the suspension containing the $Si_3N_4$ granules when compared to pure water.

Monitoring Preventive and Curative $Si_3N_4$ Efficacy Against *P. viticola*

The experimental results on leaf-disks from the two grapevine species, Cabernet Sauvignon and Cannonau, are shown in FIGS. 5A-5C and FIGS. 6A-6C. Visual inspection of treated uninfected leaves at the stereomicroscope did not reveal signs of phytotoxicity along the 5 days of the experiment. In both cases, five leaf-disk samples for each of two experimental runs were tested (n=10), with both experimental runs showing similar results. Control samples were concurrently examined. All control leaf-disks showed infections. Pathogen sporulation on Cabernet Sauvignon leaf-disks occurred 5 days after inoculation (FIG. 5A). For Cannonau, the infection on the control leaf-disks was more severe (FIG. 6A), in most cases resulting in necrosis of the infected spots. This is often observed in highly susceptible cultivars or young tender leaf tissues. No phytotoxicity was seen throughout 5 days of the experiment. Complete infectious protection was observed for samples that were either pre-treated or co-treated with $Si_3N_4$ (panels shown in FIGS. 5A and 5C, respectively). For the Cannonau species, total protection was only observed in 3 out of 5 leaf-disks in pre-treated samples (FIG. 6B), whereas there were no signs of sporulation in co-treated disks (FIG. 6C).

The potential curative effect of $Si_3N_4$ was evaluated further by treating the highly susceptible *Sultana* variety 3-days post-infection. Since residual $Si_3N_4$ granules can remain in the stomata, this test investigated whether pathogenesis could be halted at a relatively advanced state of infection. In other words, this experiment sought to determine how $Si_3N_4$ affects the mycelium inside the leaf tissues or blocks the emission of new sporangia. It was observed that *P. viticola* had colonized the intercellular spaces and produced haustoria in mesophyll cells, yet without detectable sporulation. This normally would have occurred in 5-6 days. In this case, it appears that wet $Si_3N_4$ granules partially penetrated the stomata. The subsequent elution of nitrogen from the granules likely diffused into the intracellular space where *P. viticola* develops its hyphae. This inhibitory mechanism is like the antifungal effect of ammonium bicarbonate in which the bicarbonate anion supplies the alkalinity necessary to establish a sufficient concentration of $NH_3$ to kill the pathogen.

In Situ Raman Spectroscopic Monitoring of Living Sporangia

Raman spectra of *P. viticola*, collected after room-temperature immersion for 10 min in pure water and the suspension containing 1.5 vol. % $Si_3N_4$ powder are shown in FIGS. 7A and 7B, respectively. The spectra were normalized for the scatter intensity observed at 424 $cm^{-1}$ (not shown). This signal, which represents skeletal vibrations, is a non-specific marker common to all glucans. It did not show an appreciable difference in intensity for aqueous exposure with and without the $Si_3N_4$ powder. The spectra were then deconvoluted into Voigtian sub-bands and compared. The clear differences between the two spectra are due to changes in the structure of the oomycete. The deconvoluted Raman bands for each spectrum are shown in FIGS. 7A and 7B, and their related assignments and references are listed in Table 1 below.

TABLE 1

| Band | $cm^{-1}$ | Physical Origin |
|---|---|---|
| 1 | 482 | Glucose ring vibrations<br>(cellulose, glucans, amylose, amylopectin) |
| 2 | 490 | C—C backbone stretching in polysaccharides |
| 3 | 500 | D(+)-mannose<br>Chitin |
| 4 | 510 | N-acetyl-D-glucosamine |
| 5 | 535 | N-acetyl-D-glucosamine<br>N1—C6—C5 and C2—N3—C4 in-plane ring deformation in adenine D-arabitol |
| 6 | 544 | D(+)-trehalose (exocyclic deformation)<br>N3═C4—N4 and C—C═C bending in cytosine<br>D-(−)-ribose<br>Glycerol |
| 7 | 558 | N-acetyl-D-glucosamine<br>In-phase N3—C2═O and N1C2═0 benidng in cytosine<br>Cholesterol |

TABLE 1-continued

| Band | cm$^{-1}$ | Physical Origin |
|---|---|---|
| 8 | 570 | 6-ring deformation in guanine |
|   |   | N-acetyl-D-glucosamine |
| 9 | 583 | C—C—O bending + C—O torsion in cellulose |
| 10 | 594 | C2=O bending in cytosine |
|   |   | Ergosterol |
|   |   | Glycerol |
| 11 | 603 | Trehalose |
|   |   | N3—C2=O and N1—C2=O in-phase bending in cytosine |
| 11* | 613 | Histidine |
| 12 | 623 | C4-C5-N27-C4-N9-C8 in-plane ring deformation of adenine D-arabitol |
|   |   | N—C—C bending in thymine |
| 13 | 632 | Out-of-plane C—O—H bend glycerol |
| 14 | 643 | Purine ring breathing mode in guanine |
|   |   | Chitin |
|   |   | D-arabitol |
| 15 | 649 | Chitin |
| 15* | 654 | Histidine |
| 16 | 669 | C—S stretching |
|   |   | Glycerol |
| 17 | 681 | Ring breathing in DNA Guanine |
|   |   | O=CN + CCO bending in ceramides |
| 18 | 692 | β-(1,3)-glucan |
|   |   | Trehalose |
| 19 | 710 | =C—H bending in chitin |
|   |   | Ergosterol |
|   |   | Ring breathing in DNA cytosine |
|   |   | D-arabitol |
| 20 | 715 | D-arabitol |
|   |   | Ergosterol |
|   |   | C—N stretching in lecithin |
| 21 | 731 | Imidazole ring breathing in DNA adenine |
|   |   | Trehalose |
|   |   | Phosphatidylserine |
| 22 | 746 | Ring breathing in DNA thymine |
| 23 | 753 | C5—CH$_3$ stretching in thymine |
| 24 | 764 | Deoxythymidine triphosphate |
|   |   | Amylose/amylopectin |
|   |   | O—P—O symmetric stretching in lecithin |
| 25 | 782 | C'5—O—P—O—C'3 phosphodiester symmetric stretching in DNA |
| 26 | 795 | Ring breathing in cytosine |
| 27 | 807 | 2-deoxy-D-ribose (glucan) |
|   |   | Glycerol |
|   |   | In-plane ring breathing in uracil |
| 28 | 816 | Trioleate |
| 29 | 827 | Ergosterol |
|   |   | O—P—O antisymmetric stretching in lecithin |
|   |   | C'5—O—P—O—C'3 phosphodiester antisymmetric stretching in DNA |
| 30 | 837 | Trilinoleate |
|   |   | D-dextrose |
|   |   | C1—H bending in trehalose |
|   |   | β-D-glucose |
|   |   | D-arabitol |
| 31 | 846 | C4-N9-C8 + N1-C2-N3 and N2-C2-N3 in plane deformation in guanine ring |
|   |   | L-(+)-arabinose (glucan) |
|   |   | D-(+)-glucose |
|   |   | Glycerol |
|   |   | Amylopectin (C1—O—C6 bending) |
|   |   | C—O, C—C, and C—H bending in trehalose |
| 32 | 861 | C—O vibrations in alpha-linolenic acid |
| 32* | 872 | Histidine |
| 33 | 893 | C—H ring stretching in chitin |
|   |   | Lecithin |
|   |   | Trioleate |
|   |   | Equatorial C—H bending in β-(1,3)-glucans |
|   |   | D-arabitol |
| 34 | 906 | D-dextrose |
|   |   | Trehalose |
|   |   | β-D-glucose |
|   |   | Amylose/Amylopectin |
|   |   | D-arabitol |
| 35 | 931 | Histidine |
|   |   | β-D-glucose |
|   |   | D-arabitol |
|   |   | C—H bending in arachidonic acid |
| 36 | 942 | In-plane ring deformation, N—H vibrations in adenine |
|   |   | Trilinolenin |
|   |   | D-arabitol |
|   |   | Ergosterol |
| 37 | 955 | Deoxyadenosine triphosphate |
|   |   | Lecithin |
|   |   | D-arabitol |
|   |   | Glycerol |

Spectra of Sporangia Exposed to Pure Water

Oomycetes have recently been re-classified in Stramenopiles according to an updated classification. Main structural characteristics include the presence of cellulose in the wall, mycolaminarine instead of glycogen as a carbon-based energy source, a conspicuous lack of chitin. Recent analyses of carbohydrate content in the oomycete *Phytophthora parasiticia*, closely related to *P. viticola*, revealed that the cell walls were completely devoid of chitin and consisted by ~85% of β-glucans, about 40% of which was represented by cellulose. 1,3 β-glucans with low polymerization level, and 1,3,6 β-glucans were also present, together with lower fractions of glucuronic acid and mannan. Such detailed information is not available for *P. viticola*, but previous evidence indicate that this pathogen might slightly differ from other best-known organisms in the Peronosporales. Indeed, *P. viticola* can express at least two different chitin synthases, and chitin was detected on the surface of sporangia, sporangiophores, and hyphal cell walls during in planta growth.

When oospores are dormant (as in this case), the structure of the sporangia consists of large lipid globules distributed throughout the cytoplasm-filling the entire cell lumen. They serve as a storage material for oospore germination. Mitochondria reside in small interstices among the lipid globules. The globules (or vacuoles) are of different sizes and are contained into a relatively thin interspace. The overall external walls of the oomycete are complex and divided into two layers—the outer and the inner oospore walls (OOW and IOW, respectively). The OOW and IOW are separated from each other by a thin slightly undulating plasma membrane. The IOW mainly consists of β-1,3-linked glucans (~80%; including chitin, a homopolymer formed with N-acetyl glucosamine), cellulose (~10%), and proteins (divided into wall-associated enzymes and structural proteins). Glucans are the preponderant chemical species in the IOW structure. They contain fibrils of cellulosic nature oriented in straight parallel arrays along with minor fractions of mannose and glucosamine. Chitin has an important structural function since it contributes to the rigidity and strength of the wall. The OOW is mainly composed of mannans and proteins which link it to the inner wall with β-1,6-glucans, but it also contains lipids. The oogonial walls, a thicker fibrillar wall set on the external side and separated from the oospores by a periplasmic space, contain a relatively high amount of lipids and proteins. Lipids confer hydrophobicity to the structure, which is needed to keep the pathogen safe during dormancy. Negrel et al. recently searched for *Plasmopara*-specific metabolites and identified three types of atypical lipids—ceramides, and derivatives of arachidonic and eicosapentaenoic acids. These lipids were reported to exist in *P. viticola* from the very early stage of its development.

These structural features were observed in the Raman spectrum of FIG. 7A (cf. also Table 1). For fungal structures, the cell walls of $P.$ $viticola$ mainly consist of polysaccharides including branched polymeric glucose-containing β-glucans, non-branched polymeric N-acetyl-D-glucosamine containing chitin, and polymeric mannose covalently associated with glyco/manno-proteins. Proteins and lipids only represent minor fractions of the total compared to polysaccharides. Accordingly, carbohydrate vibrational modes are expected to dominate the Raman spectrum. Cumulative signals from backbone glucose ring were found in Band 1 at 482 $cm^{-1}$. Bands contributed by chitin in the walls are found at 643, 649, 710, and 893 $cm^{-1}$ and labeled as Bands 14, 15, 19 (=C—H bending), and 33 (C—H ring stretching), respectively. These bands could all be related to chitin, although chitin is actually expected to be a minor component among the carbohydrates of the studied oomycete sample. A more probable assignment for Bands 19 and 33 is cellulose, while Bands 14 and 15 could both be also assigned to β-D-glucose in linear polymer cellulose. Fingerprint signals from cellulose and amylopectin were found at 583 $cm^{-1}$ (Band 9; C—C—O bending and C—O torsional vibrations). As expected from the structure of the walls, a marked signal was found at 893 $cm^{-1}$ (equatorial C—H bending vibrations), which served as a marker for β-glucans. The absence of Raman signals at 550 $cm^{-1}$ (C—O—C bending of glycosidic linkage), which is a fingerprint vibration for α-glucans, indicated that this polysaccharide isomer was not a preponderant component of the fungal walls. For this reason, any contribution from the α-glucans to the Raman signal at 942 $cm^{-1}$ (anti-symmetric ring vibrations) was excluded from the spectrum of FIG. 7A. Similar reasoning was applied to ring vibrations from the dextran structure, which should occur at 922 $cm^{-1}$, and its glycosidic signals at 550 $cm^{-1}$. Neither of these was detected in the spectrum of $P.$ $viticola$ exposed to water. These observations exclude any preponderant presence of this complex glucan in the present oomycete structure. In the narrow spectral region between 490 and 560 $cm^{-1}$ in FIG. 7A, Bands 2 and 3 (at 500 and 558 $cm^{-1}$, respectively) are signals from C—C backbone stretching in polysaccharides, D(+)-mannose, while Bands 4, 5, and 7 (at 510, 535, and 558 $cm^{-1}$, respectively) are assigned to cellulose, trehalose (ring deformation), and 6-D-glucose, respectively (cf. Table S1). The disaccharide trehalose is the main contributor of Band 11 at 603 $cm^{-1}$ and it also contributes to Bands 6 and 30 (at 544 and 837 $cm^{-1}$, respectively). Trehalose contributions to Bands 31 and 34 (at 846 and 906, respectively) are presumably of lower weight as compared to other carbohydrate structures (cf. Table S1). More specifically, Band 31 represents a strong cumulative signal from glucose and glucans, but it also contains several medium/strong signals from triglycerides (cf. Table S1). Trehalose is an important molecule in the metabolism of many species of fungi because it is an energy source and a protective molecule against environmental stress. For example, *Candida albicans* promotes the synthesis of non-reducing trehalose disaccharide and accumulates it in response to heat or oxidative stress. In grapevine, *P. viticola* is known to induce irreversible stomatal opening, which in turn favors host infection by zoospores, and this deregulation is associated with trehalose accumulation, with exogenously applied trehalose antagonizing stomatal closure. Therefore, the presence of elevated levels of trehalose in sporangia may represent a signal facilitating infection of grapevine leaves.

Signals related to nucleic acid were found from both phosphodiester and purine bonds. C'5-O—P—O—C'3 phosphodiester bond symmetric stretching in DNA (Band 25 at 782 $cm^{-1}$) was the strongest signal detected in the low-frequency spectrum of $P.$ $viticola$ exposed to pure water (FIG. 7A). Unlike this individual signal, the corresponding antisymmetric stretching Band 29 at 827 $cm^{-1}$ overlapped with several signals from sterols, typical molecules in fungal membranes (cf. Table 1). Vibrational bands from purines were also observed, which were related to adenine (Bands 5, 12, 21, and 36 at 535, 623, 731, and 942 $cm^{-1}$, respectively), cytosine (Bands 6, 7, 10, 11, 19, and 26 at 544, 558, 594, 603, 710, and 795 $cm^{-1}$, respectively), guanine (Bands 8, 14, 17, and 31 at 570, 643, 681, and 846 $cm^{-1}$, respectively), thymine (Bands 12, 22, and 23 at 623, 746, and 753 $cm^{-1}$, respectively), and uracil (Band 27 at 807 $cm^{-1}$). Band 31 at 846 $cm^{-1}$, which is the second strongest detected signal in the studied frequency range (cf. FIGS. 7A and 7B) is predominantly contributed by C4-N9-C8+N1-C2-N3 and N2-C2-N3 in-plane deformation of guanine rings.

Looking for peculiar signals from lipids usually present in cell membranes, a strong emission from phosphatidylserine in the studied spectral area was expected at about 734 $cm^{-1}$. Band 21 at 731 $cm^{-1}$ was observed in the spectrum for sporangia exposed to pure water (FIG. 7A). However, contributions to this band could also come from ring breathing of the imidazole ring in DNA adenine and trehalose as well. Main bands from phosphatidylcholine in the low-frequency spectrum were expected at around 719 and 875 $cm^{-1}$. However, in FIG. 7A, neither of these signals was observed in the sporangia exposed to pure water. The main low-frequency bands at 519 and 868 $cm^{-1}$, which were due to phosphatidylinositol were also missing in the spectrum of water-exposed sporangia. Conversely, clear signals possibly from sterols and ceramides at 558 (Band 7) and 681 $cm^{-1}$ (Band 17), respectively, were detected. Unfortunately, these signals strongly overlapped with signals from DNA purines. Clear signals were contributed by ergosterol, the most abundant sterol in fungal cell membranes. This molecule is characterized by a complex Raman spectrum, which includes marked low-frequency signals at 594, 710, 725 827, and 942 $cm^{-1}$ (i.e., Bands 10, 19, 20, 29, and 36, respectively).

Sterols are characterized by complex Raman spectra, which include clear low-frequency signals (cf. Table 1). However, an accurate screening revealed that none of these low frequency signals was free of overlapping signals from other membrane molecules. Sterols are essential components in modulating fluidity, permeability, and the integrity of the cell membrane. In contrast to true fungi, Peronosporales are unable to synthesize sterols, although they need them for both sexual and asexual reproduction. In *Phytophthora*, fitosteroles from the plant host are taken up and used without any further modification.

Regarding other lipid compounds, arachidonic acid is a well-known elicitor released by oomycetes in planta and recent findings indicate that ceramides and derivatives of arachidonic and eicosapentaenoic acid in *P. viticola* are produced during the very early stages of the infection process. Bands 32 (at 861 $cm^{-1}$) and 35 (at 931 $cm^{-1}$) were assigned to C—O vibrations in alpha-linolenic acid and C—H bending in arachidonic acid. The former band serves as a fingerprint of fatty acids peculiar to *P. viticola*, while the latter unfortunately overlaps with bands from glucose and histidine, (as described later). Fatty acids are commonly released into plants upon infection by oomycete pathogens. The strongest signal at low frequency of the glycerophospholipid lecithin (assigned to C—N stretching) could also contribute Band 20 (at 715 $cm^{-1}$). Additional bands from lecithin appear at 764 and 827 cm$^{-1}$ (Bands 24 and 29, respectively). These are attributed to O—P—O symmetric and antisymmetric stretching, respectively. An attempt to give complete labeling of the spectrum shown in FIG. 7A is given in Table 1.

Spectra of Sporangia Exposed to 1.5 Vol. % Si$_3$N$_4$ Water Suspension

Changes in the cellular structure *P. viticola* sporangia induced by the presence of Si$_3$N$_4$ in aqueous suspension are shown by the spectral variations between FIGS. 7A and 7B. As a general trend, all Raman Bands for the sporangia exposed to the Si$_3$N$_4$ suspension showed relatively lower intensities when compared to the corresponding bands of sporangia in pure water. The main variations are as follows:

Several bands of high or medium intensity disappeared or occurred only with significantly reduced intensity in the spectrum of sporangia in the Si$_3$N$_4$ suspension. They included: Bands 5 and 12 (at 535 and 623 cm$^{-1}$, respectively) from adenine; Band 10 (at 594 cm$^{-1}$) from cytosine; Band 25 (at 782 cm$^{-1}$) from C'5-O—P—O—C'3 phosphodiester symmetric stretching in DNA; Band 31 (at 846 cm$^{-1}$) from guanine; and, Band 33 (at 893 cm$^{-1}$) from cellulose (possibly also contributed by chitin).

Three new bands appeared in the sporangia spectrum exposed to the Si$_3$N$_4$ suspension. They were: Band 11* (at 613 cm$^{-1}$), Band 15* (at 654 cm$^{-1}$), and Band 32* (at 872 cm$^{-1}$). The origin of these Raman signals is due to chemical modifications of pre-existing molecules or from new chemical species produced by the sporangia in response to environmental stress (as discussed later).

Additional spectral variations in the presence of Si$_3$N$_4$ were: Band 2 from C—C backbone stretching in polysaccharides and Band 3 from D(+)-mannose (at 490 and 500 cm$^{-1}$, respectively). These signals underwent an intensity-trend inversion, the former becoming more intense than the latter; and Band 9 from cellulose (at 583 cm$^{-1}$) which also showed relatively high intensity. A similar trend was observed for Band 17 (at 681 cm$^{-1}$), which was assigned to O=CN and CCO bending in ceramides, but also had contributions from the guanine ring. Band 23 (at 753 cm$^{-1}$) representative of thymine, Band 35 from histidine (at 931 cm$^{-1}$) and Band 36 from adenine (at 942 cm$^{-1}$) experienced significant decreases in intensity.

The reasons for the bold spectral differences between sporangia exposed to pure water and the aqueous Si$_3$N$_4$-powder suspension was the result of chemical reactions occurring between sporangia and the Si$_3$N$_4$ granules.

Example 5

The chemical interaction between *P. viticola* and Si$_3$N$_4$

By direct observation, this study confirmed the robust pH buffering of Si$_3$N$_4$ in an aqueous suspension and the release of gaseous ammonia (cf. FIGS. 1A-1C). The observed pH buffering was a transient phenomenon because of the gradual coverage of the Si$_3$N$_4$ surface by orthosilicic acid and due to gaseous nitrogen leaving the open system (cf. gas bubbles observed in FIG. 1D).

In FIGS. 2G-2K, Si$_3$N$_4$ granules appeared to be electrostatically attracted to the walls of the sporangia. The cell walls of Peronosporales consist of only limited amounts of chitin and predominantly of glucan complexes and mannoproteins. The latter constituents are linked to β-glucans via glycophosphate groups containing five mannose residues. Phosphorylated mannosyl side chains confer a negative charge to cell walls. Moreover, the functional groups at the surface of the sporangium, (i.e., phosphate, carboxyl, and amino groups) become deprotonated in the highly alkaline environment. They interact with positively charged sites on the Si$_3$N$_4$ surface, which include nitrogen vacancies (charged 3+) and N—N bonds (charged +). Once in contact, the interaction between sporangia and Si$_3$N$_4$ granules is strongly affected by the highly alkaline pH which is locally developed and by the passive diffusion of highly volatile NH$_3$ molecules across the cell walls. These ionic interactions result in rupture of the membrane and the observed abortion of immature zoospores (FIGS. 2A-2C) after only 1 min of contact with the Si$_3$N$_4$ granules.

Interpretation of the Raman Analyses

The main chemical reaction expected by ammonia on nucleic acid is hydrolysis. Nucleic acid is first decomposed into two dinucleotides, one containing adenine and uracil groups, while the other retains guanine and cytosine groups. Although the adenine-uracil dinucleotide is comparatively more stable than the guanine-cytosine, both decompose into mononucleotides at pH values >8. In the presence of NH$_3$, adenine and guanine, and the phosphodiester bonds are deprotonated and strongly destabilized. At any alkaline pH, the hydrogen at N(3) in thymine is also removed due to the weak basicity of the nitrogen ring. Upon exposure to Si$_3$N$_4$, the most striking spectral variations were the disappearance of the two strongest signals, namely Band 25 and 31 (i.e., related to C'5-O—P—O—C'3 phosphodiester symmetric stretching in DNA and C4-N9-C8+N1-C2-N3 in-plane deformation of guanine rings, respectively). A significant decrease in intensity, if not the disappearance, of several bands related to adenine (Bands 5, 12, and 36) and cytosine (Bands 6, 10, 11, 19, and 26) was noted (cf. FIGS. 7A-7B). These observations are in line with previous studies on interactions between Si$_3$N$_4$ and pathogens. Schematic diagrams of the DNA nucleobases before and after the oxidizing effect created by diffusion of NH$_3$ and the nitrogen-free radical reactions are provided in FIGS. 9A and 9B, respectively. The most striking features are the cleavage of the phosphodiester bond in the DNA with the disappearance of stretching, Band 25, the opening of the guanine ring (G→Gh) due to interaction with peroxynitrite radicals, and the disappearance of its strongest ring vibration, Band 31. The significant intensity reduction of Band 14, also contributed by ring breathing mode in guanine, confirms the Gh mechanism shown in FIG. 9B. A modification was also observed for the adenine unit (A), with the oxidation of its structure (A'). Adenosine oxidation is believed to be responsible for the disappearance of the two ring-deformation Bands 5 and 12, due to the formation of two oxygen double bonds as shown in FIG. 9B. The modification of cytosine nucleobase (C) into the 5-OH—U structure can explain the disappearance of Bands 6 and 10. The former, which in the original cytosine structure represents N3=C4-N4 and C—C=C bending modes, disappeared because these bonds are replaced with N3-C=O and C—C—OH bonds, respectively, in the oxidized 5-OH—U unit, and the latter, which is from C2=O bending in the original cytosine structure. It was canceled out by the appearance of a symmetric C4=O bond in the oxidized 5-OH—U structure. Bands from thymine and uracil (U) appear more stable because they possess only one C=C double bond. Finally, note that some bands related to oxidized nucleobases showed a lower decrease in intensity (i.e., Bands 7, 17, and 21 at 558, 681, and 731 cm$^{-1}$, respectively). However, these bands shared the characteristic of being contributed by lipids (cholesterol, ceramide, and phosphatidylserine, respectively).

Figure 9D:
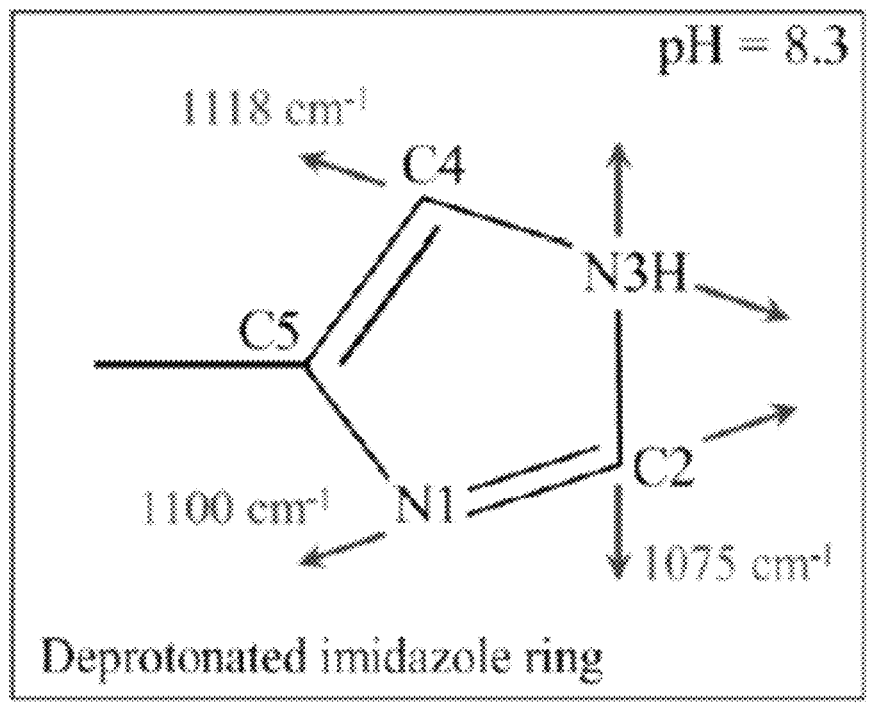

Sonois et al. described the Raman behavior of several amino acids by both experiments and theoretical calculations. In the case of histidine, environments with increasing pH led to the appearance of new Raman bands at ~613, 656, and 860 cm$^{-1}$. These three bands correspond to the new bands detected in sporangia exposed to $Si_3N_4$ (cf. FIG. 7B) and labeled as Bands 11*, 15*, and 32*. The side chain of a histidine molecule is an aromatic imidazole ring that contains 6 π-electrons. Depending on environmental pH, different tautomeric and ionic forms of histidine can be present. At pH<6, a positively charged form dominates with both the N atoms in the protonated ring (FIG. 9C). Conversely, at increasing pH values, histidine loses one proton in its imidazole ring which gradually gives rise to neutral forms (FIG. 9D). Valery et al. studied the conformational change of self-assembled histidine-containing peptides and their stabilized globular conformation at high pH. Vibrational spectroscopy assessments revealed histidine-serine H-bond and histidine-aromatic interactions. At pH=8.5, histidine deprotonation occurred and altered the C—N ring stretching bands in the Raman spectrum in the frequency range 1050~1150 cm$^{-1}$.

In an attempt to strengthen the histidine interpretation for the newly formed Bands 11*, 15*, and 32*, the C—N stretching spectral area for the imidazole ring in the frequency range 1,050~1,150 cm$^{-1}$ was monitored. Different trends were observed when comparing Raman spectra collected on sporangia in pure water (pH=6.5) versus the $Si_3N_4$ suspension (pH=8.3, cf., FIGS. 10A and 10B, respectively). According to a recent paper by Pogostin et al. and considering the ring structures depicted in FIGS. 9C and 9D, the spectroscopic fingerprints for deprotonation of the histidine ring are as follows:

A new strong Band appeared at ~1075 cm$^{-1}$. This is in addition to the band that was originally observed at ~1090 cm$^{-1}$ whose intensity appeared to be significantly weakened. These bands are related to stretching vibrations of the (C2-N3)$^+$ and (C2-N3) bond configurations, respectively. The former configuration involves a stronger bond (i.e., due to N1-C2-N3 electron sharing). Its vibrational energy is greater and it appears at higher frequencies.

A similar trend was observed for the stretching bands in the pristine (C4-N3)+ and deprotonated (C4-N3) bond configurations, which appeared at ~1125$^{-1}$ (shoulder band) and ~1118 cm$^{-1}$ (pristine band), respectively. This trend can be explained using the same reasoning given in the preceding paragraph, even though the frequency shift toward a lower frequency is less pronounced than in the case of the preceding paragraph. This circumstance is related to the balance of bonding strength within the deprotonated ring. The C2-N3 bond is weaker than the C4-N3 bond because its neighboring double bond N1=C2 is stronger than the double bond C4=C5 next to C4-N3 (i.e., due to the higher electronegativity of N over C).

No significant shift or intensity variation, but only a slight broadening, was observed for the stretching band related to the (C2-N1(H))$^+$ bond (at ~1100 cm$^{-1}$) when the ring configuration was deprotonated.

Figure 10A:
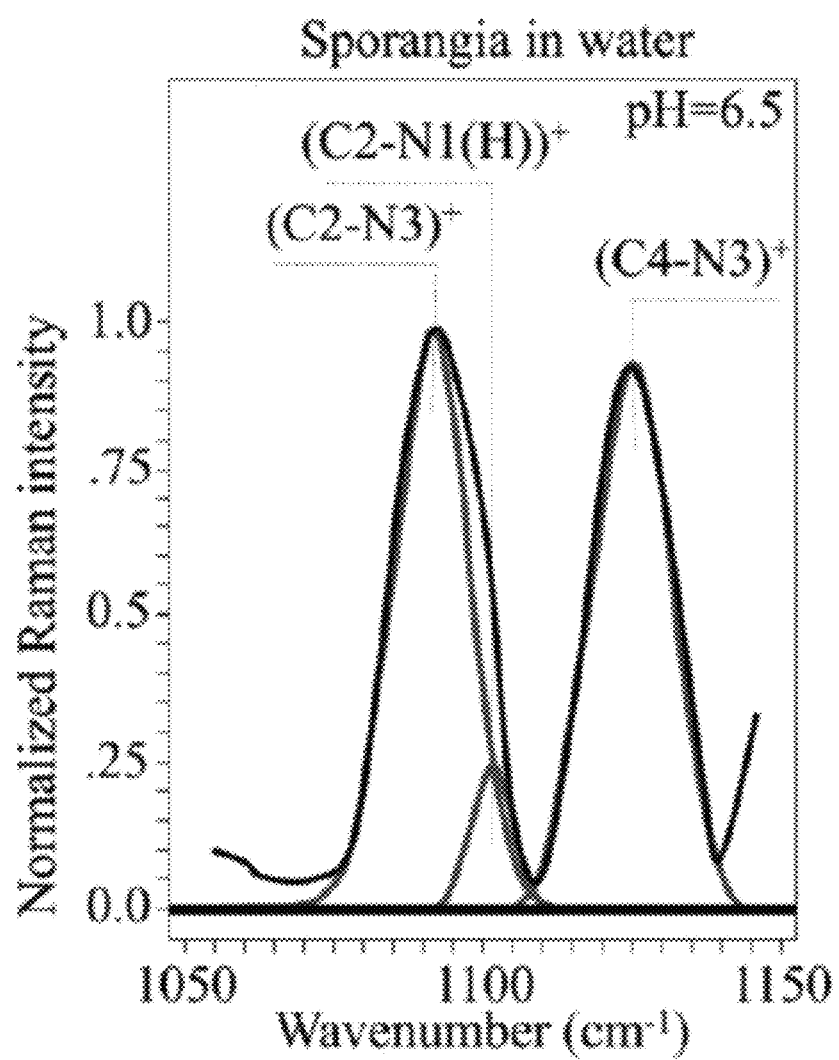
Figure 10B:
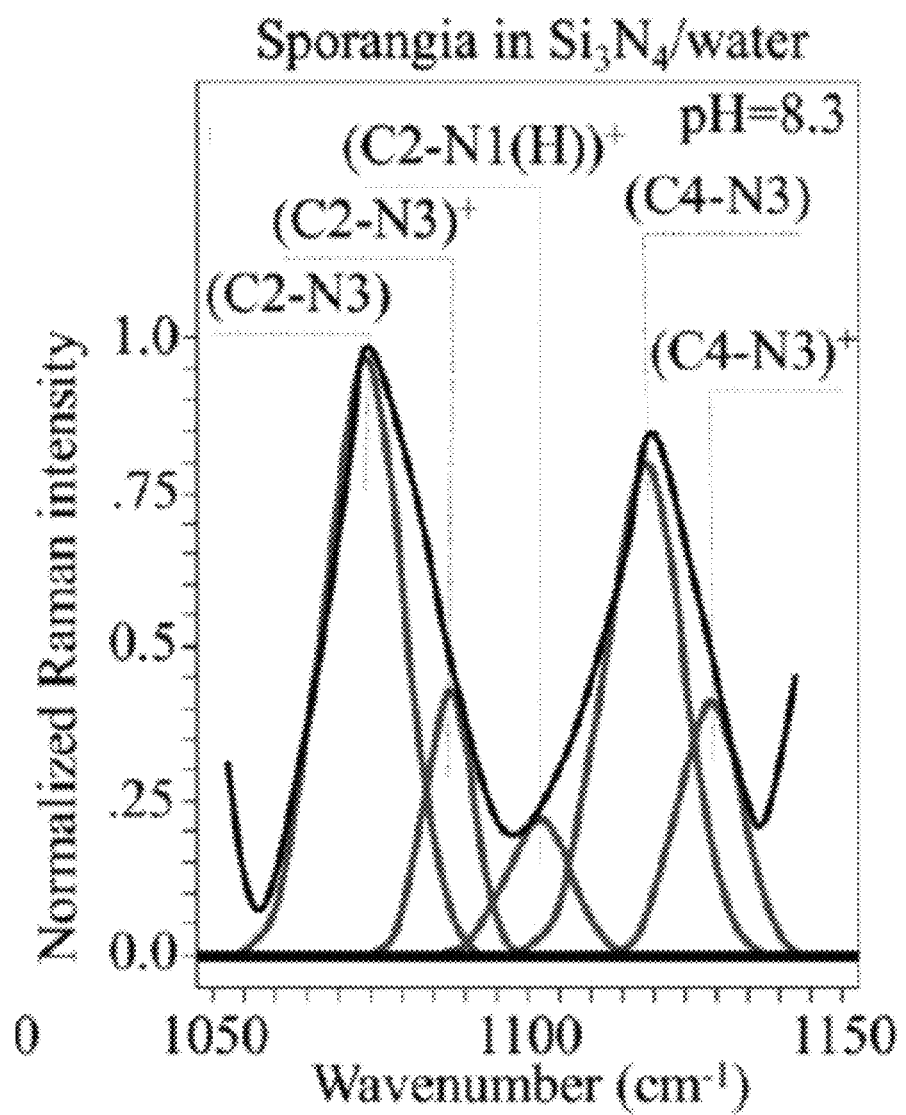

Note also that additional Raman analyses of the imidazole ring of histidine residues in the C═C and C═N spectral zone at ~1600 cm$^{-1}$ (not shown) provided features that were consistent with the results shown in FIGS. 10A and 10B. Based on the above Raman analyses, the Raman spectroscopic signatures are related to deprotonation occurring in a highly alkaline environment. These reactions are common to histidine-containing peptides at high pH values.

Histidine kinase proteins are present in most prokaryotic and eukaryotic organisms. They regulate several adaptive transcriptional responses to a variety of environmental factors. In oomycetes, functional analyses of histidine kinases are missing, while phosphorylation at histidine sites is a common metabolic response of fungi to osmotic stress. For example, in response to perceiving osmotic stress as a change in environmental conditions, conserved histidine residues are phosphorylated with a phosphate group from an adenosine triphosphate, which agrees with the reduction in adenosine Raman bands detected in FIG. 7B. Successive transfer of the phosphoryl group to conserved aspartate residues results in a modulation that mediates signal transfer to the signaling pathway. Because of the highly localized alkalinity between $Si_3N_4$ granules and sporangial walls, an appreciable fraction of $NH_3$ penetrates the endocytotic space and severely alters the osmotic balance of the sporangia. Therefore, alteration of the Raman data due to $Si_3N_4$ exposure suggests that sporangia reacted to osmotic stress; and the histidine kinase perceived the increase in osmotic stress similar to what was hypothesized for *Saccharomyces cerevisiae*. It should be noted that in the model oomycete *Phytophthora infestans*, protein kinases have been found to be involved with sporangial cleavage during germination.

Figure 3B:
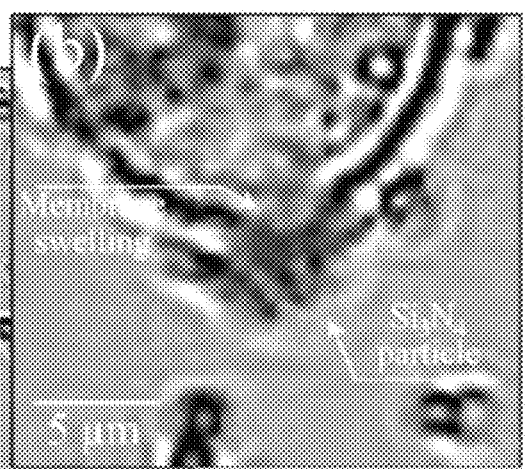
Figure 3A:
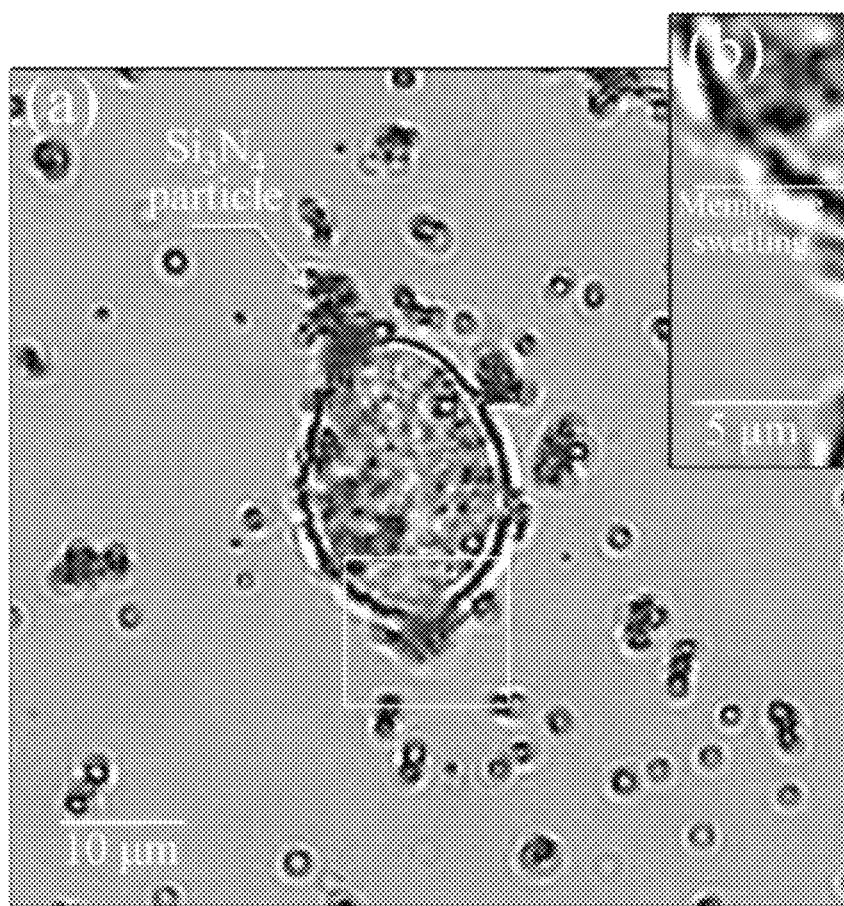
Figure 5A:
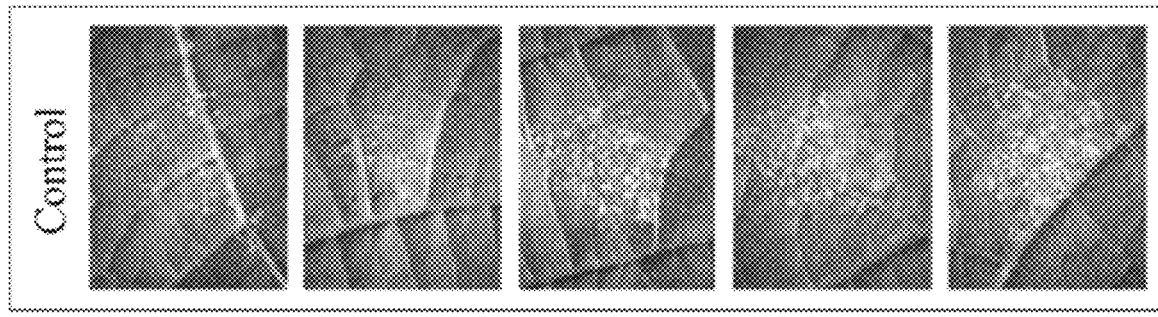
Figure 5B:
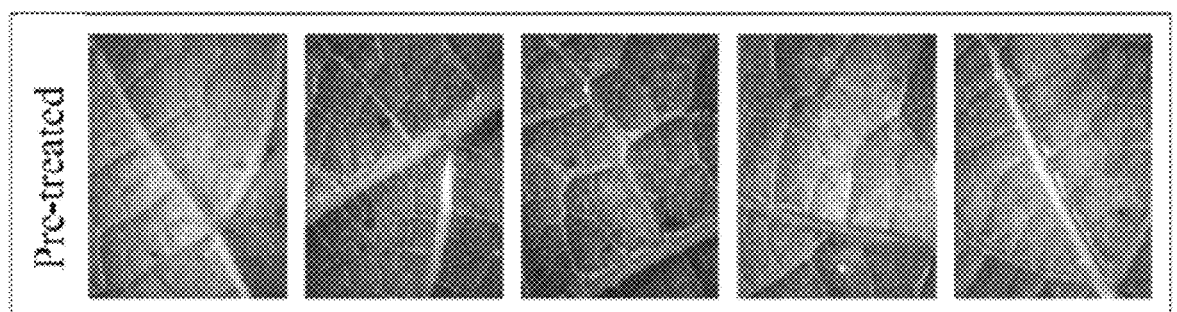
Figure 5C:
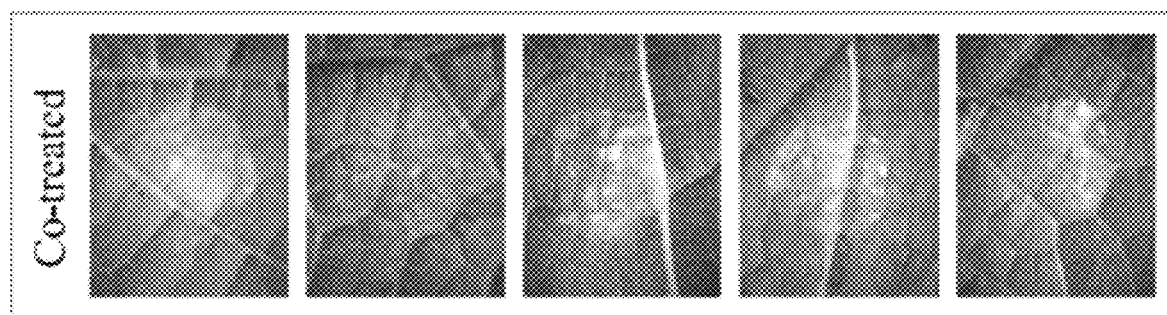
Figure 6A:
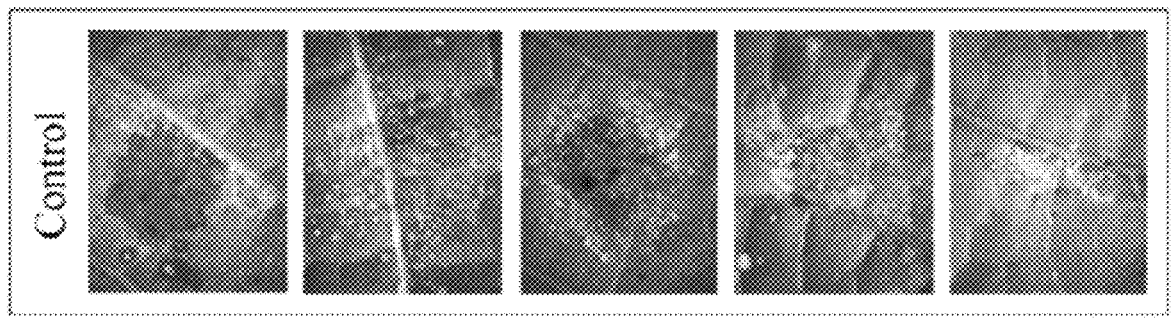
Figure 6B:
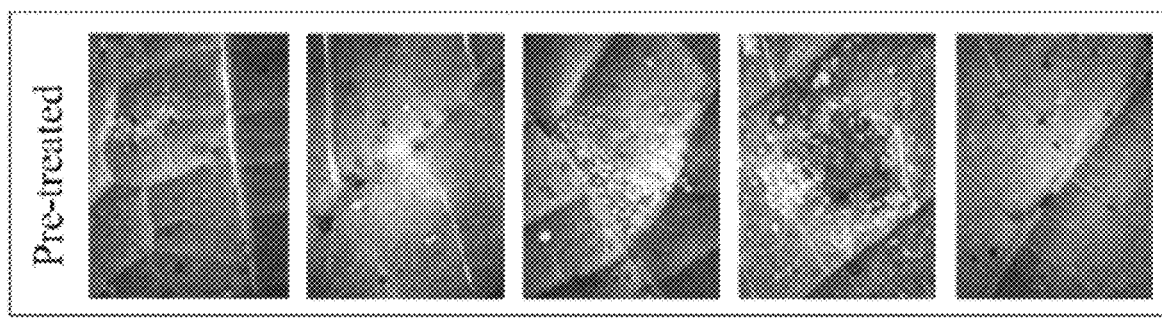
Figure 6C:
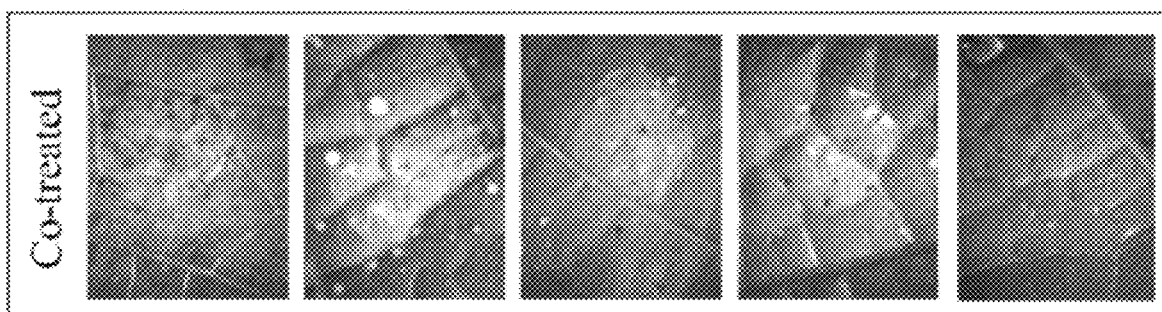

In the present study, this hypothesis is corroborated by the disappearance of the main signal for chitin (i.e., Band 33 at 893 cm$^{-1}$) and by a significant reduction in the intensity of all other signals (i.e., Bands 3, 14, 15, and 19 at 500, 643, 649, and 710 cm$^{-1}$, respectively) related to cellulose (and/or chitin) and other linear carbohydrates in the structure of the cell walls. Linear polymeric chains in cellulose are linked together by β-glycosidic bonds. These bonds are not affected by the alkaline pH levels induced by $Si_3N_4$, or by any direct interaction with $NH_3$. On the other hand, hydrolytic enzymes can break down the glycosidic bonds of chitin and thereby alter the cell walls of phytopathogens. Given how the Raman experiments were conducted, the enzymatic reaction could only be intrinsic to sporangia themselves. It is known that phycomycetes are enzymatically capable of controlling the plasticity of their walls. Fungal walls are "softened" and must expand for bud emergence and subsequent growth. They are also remodeled during the formation of pseudohypha and spore walls with phenolic crosslinks. The walls' inner matrix of interlinked β-glucan and chitin provides tensile strength and rigidity. However, the wall composition can be remodeled in response to environmental changes through mitogen-activated protein kinase pathways. The cell walls' elasticity is modulated by rapid structural realignments, which enables pathogen survival to osmotic shock. As shown in FIGS. 3A and 3B, bud emergence is observed in the proximity of $Si_3N_4$ granules, a phenomenon in many cases leading to premature sporulation (cf. FIGS. 2A-2C).

Turchini et al. measured a 50% decrease in chitin content for fungal cells grown in a high-osmolarity medium as compared to those grown in low-osmolarity, in agreement with previous data showing that the chitin synthase activity in fungi is higher for cells grown in a low- vs. a high-osmolarity media. These researchers interpreted the observed weakening of the fungal walls in high-osmolarity medium as a rescuing mechanism to enable membrane stretching and enhance the probability of maintaining cell integrity. Based on these studies, the disappearance of the main chitin Band 33 of the sporangia exposed to $Si_3N_4$ is an enzymatic fingerprint activated by the fungal cells in the attempt to resist osmotic stress. Finally, it should also be noted that premature germination, which was surprisingly observed after only 1 minute of contact with $Si_3N_4$ (FIGS. 2A-2C), is likely the consequence of the sporangia's failure to produce de novo synthesis of chitinous walls as needed to carry germination up to maturity.

the Effect of $Si_3N_4$ in Comparison with Other Eco-Friendly Approaches

Figure 11A:
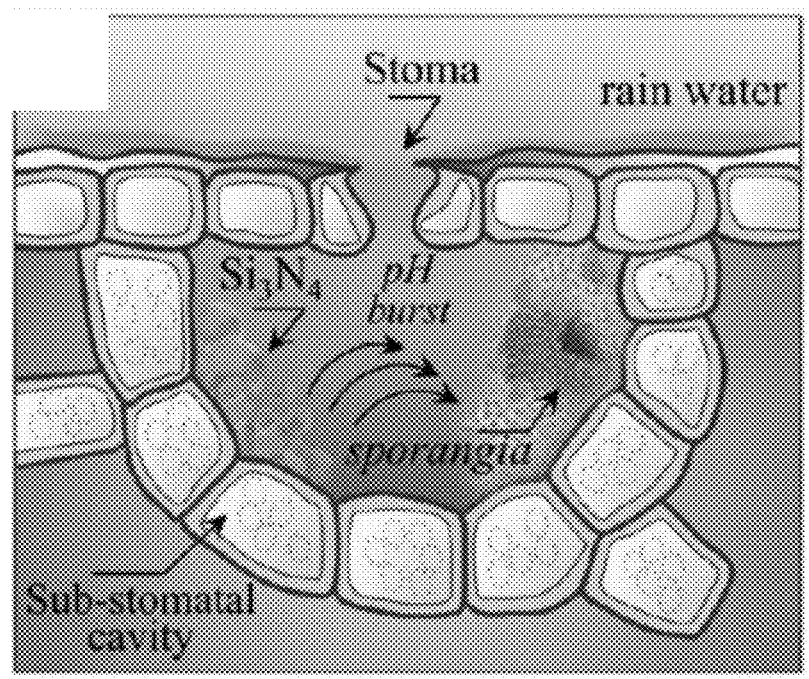
Figure 11B:
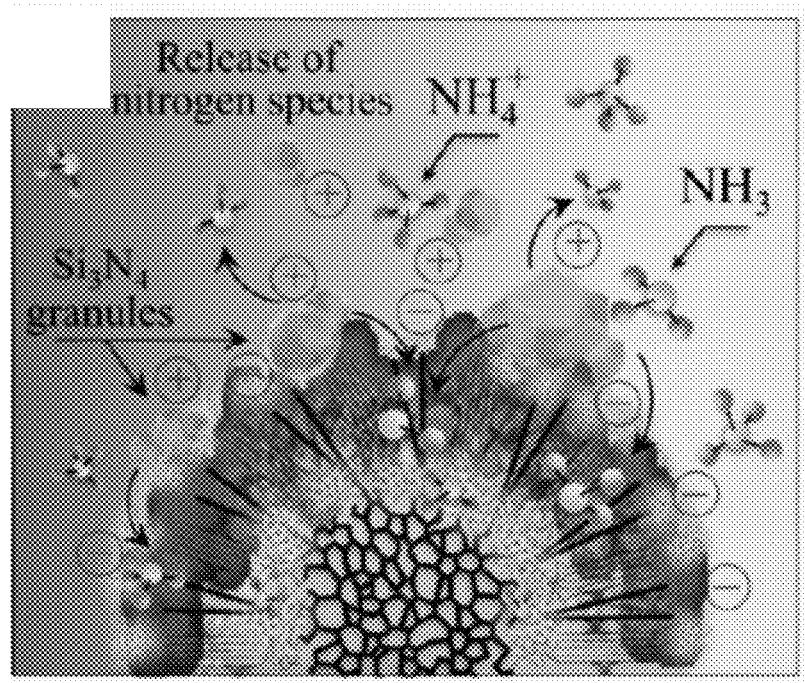

*P. viticola* enters the host leaf tissue through the stomata and remains in the substomatal air spaces where it slowly develops for 12-15 hours until forming the first haustorium. This initial period is considered the most critical in the overall infective process. $Si_3N_4$ particles could be preventively sprayed on grapevine leaves before the start of this period. Upon entering the stomata, they remain trapped inside for a long period (e.g., perhaps one season). During rain events, water will repeatedly activate the elution of ammonium moieties and a rapid rise in pH, thereby creating a hostile environment for the sporangia (FIG. 11A). In contrast, currently available fungicides, based on copper hydroxide and copper sulfate, only provide preventive protection to grapevines. They are not systemic and therefore incapable of eradicating pre-existing infections. Moreover, they are readily washed away by rain. Consequently, one advantage of a solid-state fungicide like $Si_3N_4$ is its repeated activation during rain events (cf. FIGS. 1A-1C) and its efficacy against the pathogen even after the fungi penetrate leaf tissues. The antifungal mechanisms active at the pathogen/$Si_3N_4$ interface are schematically summarized in FIG. 11B.

Three strategies have been pursued to replace the use of environmentally unfriendly agrochemicals: (i) the development of new eco-friendly antifungal products; (ii) the use of microorganisms for induction of systemic resistance against plant pathogens; and, (iii) the manipulation of host-pathogen interactions through the control of population genetics.

Effective eco-friendly molecules that can replace agrochemicals are polysaccharides. For example, oligosaccharide chitosan is an efficient promoter of plant defenses with the capacity of inducing an accumulation of molecules that inhibit the growth of parasites (i.e., phytoalexins, and potent antioxidants, such as trans- and cis-resveratrol and their derivatives). Chitosan also triggers the production of enzymatic molecules (e.g., chitinase and α-1,3-glucanase) in grape leaves which are capable of lysing pathogens, thereby significantly reducing the probability of downy mildew infections. Low-molecular-weight chitosan also possesses the ability to penetrate fungal conidia causing membrane disorganization and loss of cellular content. It interacts with external anionic components of the fungal plasma membrane which results in membrane rupture. Another polysaccharide capable of controlling *Plasmopara viticola* infections is the water-soluble β-1,3-glucan laminarin, which can be obtained from brown alga, *Laminaria digitata*. The origin of its antipathogenic effect resides in an efficient elicitation of defense responses in grapevine cells. However, despite the well-established antifungal efficiency of chitosan and laminarin, reports show undesired effects of these polysaccharides on the amino acid composition of must from grapevines, with alterations of nitrogen concentration in must, a key parameter in the final vine quality.

Vanillin and garlic extract have also been classified as eco-friendly antifungal substances. The former has aldehyde groups in its chemical structure, while in the latter includes the powerful antifungal activity of allicin, block lipids, proteins, and nucleic acid synthesis in fungal yeast. Nevertheless, the main disadvantage of these compounds is they readily react with water. Allicin, for example, promptly forms diallyl disulphide, a compound with less pronounced antimicrobial activity.

Other naturally derived compounds tested include hydrolyzed proteins, plant extracts, and inorganic salts. In this context, a recent promising strategy has been proposed based on the use of a selected aptamer peptide, specifically inhibiting *P. viticola* cellulose synthase 2, and therefore preventing infection with no adverse effects on non-target organisms.

Among inorganic salts, examples include mainly bicarbonates, phosphates, silicates, chlorides, and phosphites. Their activity has been mainly reported against powdery mildews of different crops including grapevine, while only sodium bicarbonate showed a limited efficacy against grapevine downy mildew. The development of silicon nitride-based phytosanitary products falls within this last category. In the present context, silicates deserve a particular mention: several soluble silicate salts possess direct and indirect activities against different fungal infections, acting by both stimulation of the plant's natural defense mechanisms and strengthening of plant cell walls. The production of $SiO_2$ and $Si(OH)_4$ from $Si_3N_4$ (as described in reactions (1)-(3)), may thus complement the direct action of ammonia on *P. viticola* sporangia and zoospores by inducing plant resistance, which can be at least partially responsible for the almost complete inhibition of the infection process observed in our experiments. Moreover, in comparison to soluble salts, which are readily washed off by rain, $Si_3N_4$ could provide more lasting protection through different elution cycles of ammonium moieties from the insoluble powder, and generation of reactive nitrogen species, in line with previous studies on human pathogens. In fact, upon treatment, $Si_3N_4$ particles may remain trapped inside the stomata (FIG. 11A), and during rain events water may repeatedly generate a hostile chemical environment (FIG. 11B), possibly impairing sporangia emission in secondary infection cycles, thus reducing the need for further chemical treatments. Some microorganisms can provide systemic resistance against plant pathogens, thereby reducing disease severity. The resistance is the result of alterations of the host plant physiology to produce metabolic responses that lead to the synthesis of protective enzymatic molecules. The *Trichoderma harzianum* strain T39, a commercial biocontrol agent, may be a suitable microorganism for systemic resistance against downy mildew. The efficiency of three different bio-elicitors *Trichoderma harzianum, Streptomyces plicatus*, and *Pseudomonas fluorescens*) has been investigated in inducing systemic resistance. *Trichoderma harzianum* provided the strongest resistance to downy mildew disease, followed by *Streptomyces plicatus*. However, an increase in both chlorophyll and carotene was observed upon treatment; and considerable diversity could be found in protein expression levels among the three biotic therapies. In general, the use of microorganisms for inducing systemic resistance has the drawback of becoming effective against only a single form of resistance. They suffer from diversity which can ultimately engender pathogen mutations.

From a more general viewpoint, the molecular mechanisms behind the pathogenesis of oomycete *Plasmopara viticola* are largely unknown. To trigger an infection, cytoplasmic and apoplastic effector proteins are secreted by oomycetes, which suppress immunity and enhance plant susceptibility. Effectors in sequenced oomycetes genomes have been found to rapidly evolve and to acquire new functions that counteract plant resistance genes and suppress plant RNA silencing mechanisms. Counteracting the action of effector proteins has been traditionally difficult because of the complexity involved with genome sequencing. It mandatorily requires multi-omics approaches. Utilizing comparative genomics, Brilli et al. recently reported the discovery of a missing metabolic feature in the *Plasmopara viticola* genome that could explain its biotrophic mode of life. They identified a protein effector triggering immunity in a resistant grapevine. A new method developed by German et al. for parallel analyses of RNA ends, which combines small RNA and genome-wide degradome sequencing, uncovered the complex network of small RNAs that target genes during infection. Accordingly, a new bi-directional RNA silencing strategy was suggested. Although pathometric techniques have recently reached high levels of sophistication, they have also unveiled the complexity of pathogen-host interactions. The studied system could only be coded and interpreted for a limited number of genes, (many gene-for-gene interactions were expected), even if only "resistant" and "susceptible" types of reaction were recognized.

$Si_3N_4$ exhibits an intriguing multi-mechanistic antipathogenic behavior with the potential of solving several of the shortcomings of the alternative approaches to environmentally friendly agrochemistry. The broad-spectrum antipathogenic effectiveness of $Si_3N_4$ is due to its nitrogen chemistry. Water acts as a trigger to release nitrogen leading to a cascade of reactions that result in lysis of the pathogen. The nitrogen species generated at the surface of $Si_3N_4$ alter the pathogens' proteins, induce nitrosative damage to DNA, and stimulate metabolic enzymes that modify the pathogen membrane structures. These findings are in line with previous studies on human pathogens. The multi-mechanistic lytic reactions occurring in the pathogen's cytoplasm due to the diffusion of $NH_3$ across cell walls reduces the probability of mutations by the pathogen. Moreover, because $Si_3N_4$ is used as an implantable biomaterial, it is not toxic to eukaryotic cells. It contains only environmentally friendly elements, which are intrinsic to the earth's prehistory. Several plant species benefit from Si fertilization, particularly in alleviating biotic and abiotic stresses. Ammonium, which is generated by $Si_3N_4$ decomposition, is the primary inorganic species involved in the synthesis of organic nitrogen. Ammonium and nitrate ions in the soil are directly absorbed through root-specific transporters and effectively utilized. In the case of grapevines, $NH_4^+$ represents up to 80% of the total nitrogen before veraison while decreasing to 5-10% after maturation and even lower after must fermentation. Nitrogen eluted from $Si_3N_4$ may contribute to an improvement in berry quality and fermentation conditions. As a limiting factor, care should be taken to balance the quantities of nitrogen from fertilizers and $Si_3N_4$ because excess nitrogen may alter the production of phenolic compounds and the taste or quality of both grapes and wine. Several plant species benefit from Si fertilization, particularly in alleviating biotic and abiotic stresses.

Example 6

These examples provide new insight into the effect of $Si_3N_4$ against grapevine infections by *P. viticola*. As an inorganic environmentally friendly agent, it has the potential to replace heavy metal agrochemicals and newer eco-friendly antipathogenic molecules. The use of $Si_3N_4$ is also consistent with current regulatory trends directed at reducing the use of heavy metals in viticulture. The unique chemistry of $Si_3N_4$ induces osmotic stress in sporangia and triggers abortion of their immature zoospores even at concentrations as low as 1.5 vol. %, which is in the molar range of concentration used for other inorganic salts in agriculture application, such as bicarbonates. Raman experiments provided important information on chemical mechanisms which included cleavage of phosphate deoxyribose backbone and disruption of guanine rings. Experiments on leaves from different grapevine species showed that $Si_3N_4$ was effective in severely reducing or blocking the infection process at very early stages, affecting sporangia germination and zoospores viability, as revealed by microscopic observations. The use of $Si_3N_4$ will be most beneficial for grapevines with a high nitrogen requirement, where copper-based formulations are detrimental not only to the environment but also to wine quality. Since $Si_3N_4$ only contains environmentally friendly elements, this ceramic will also be a suitable alternative to contact fungicides, which include toxic copper and sulfur elements. $Si_3N_4$ can be regarded as a promising biopesticide with multiple benefits in comparison to conventional synthetic products and technical advantages over other inorganic salts and may be a useful component in integrated disease management.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for treating or preventing a fungal pathogen in a plant, the method comprising:
    contacting the plant with a composition comprising silicon nitride wherein the silicon nitride reduces the pathogen in the plant.

2. The method of claim 1, wherein the composition comprises a slurry of silicon nitride particles and a solvent.

3. The method of claim 2, wherein the solvent is water.

4. The method of claim 1, wherein the composition comprises about 0.5 vol. % to about 20 vol. % of silicon nitride.

5. The method of claim 1, wherein the composition comprises about 1 vol. % to about 3 vol. % of silicon nitride.

6. The method of claim 1, wherein the contacting comprises spraying, misting, or dipping.

7. The method of claim 1, wherein the plant is an agriculture plant, a tree, or a vine.

8. The method of claim 7, wherein the agriculture plant is a grain, legume, tuber, grass, oilseed, vegetable, or fruit; the tree is a fruit, landscape, or forest tree; and the vine is a grapevine.

9. The method of claim 1, wherein the pathogen causes a plant disease chosen from downy mildew, powdery mildew, *Botrytis* rot, *Fusarium* rot, rust, *Rhizoctonia* rot, *Sclerotinia* rot, or *Sclerotium* rot.

10. The method of claim 1, wherein the fungus is *Plasmopara viticola*.

11. The method of claim 10, wherein the plant is *Vitis vinifera*.

12. The method of claim 11, wherein *Vitis vinifera* is Cabernet Sauvignon, Cannonau, or *Sultana*.

\* \* \* \* \*